(12) United States Patent
Fisher et al.

(10) Patent No.: US 9,384,496 B2
(45) Date of Patent: Jul. 5, 2016

(54) CALL TRACKING SYSTEM AND METHOD

(71) Applicant: Soleo Communications, Inc., Fairport, NY (US)

(72) Inventors: William Fisher, Rochester, NY (US); Robert Deming, Avon, NY (US)

(73) Assignee: Soleo Communications, Inc, Victor, NY (US)

(*) Notice: Subject to any disclaimer, the term of this patent is extended or adjusted under 35 U.S.C. 154(b) by 0 days.

(21) Appl. No.: 14/859,659

(22) Filed: Sep. 21, 2015

(65) Prior Publication Data

US 2016/0012471 A1    Jan. 14, 2016

Related U.S. Application Data

(63) Continuation-in-part of application No. 14/329,352, filed on Jul. 11, 2014, now Pat. No. 9,141,970, which is a continuation of application No. 13/279,162, filed on Oct. 21, 2011, now Pat. No. 8,874,102.

(60) Provisional application No. 61/442,423, filed on Feb. 14, 2011.

(51) Int. Cl.
| | | |
|---|---|---|
| *H04M 3/487* | (2006.01) | |
| *G06Q 30/02* | (2012.01) | |
| *H04M 3/42* | (2006.01) | |
| *H04M 3/22* | (2006.01) | |
| *H04M 3/493* | (2006.01) | |

(52) U.S. Cl.
CPC ......... *G06Q 30/0242* (2013.01); *H04M 3/2218* (2013.01); *H04M 3/2281* (2013.01); *H04M 3/42* (2013.01); *H04M 3/42059* (2013.01); *H04M 3/487* (2013.01); *H04M 3/493* (2013.01)

(58) Field of Classification Search
CPC ............................ G06Q 30/0242; H04M 3/42
See application file for complete search history.

(56) References Cited

U.S. PATENT DOCUMENTS

| | | |
|---|---|---|
| 5,884,262 A | 3/1999 | Wise et al. |
| 6,011,844 A | 1/2000 | Uppaluru et al. |
| 6,349,290 B1 | 2/2002 | Horowitz et al. |

(Continued)

FOREIGN PATENT DOCUMENTS

| | | |
|---|---|---|
| KR | 20020027397 | 4/2002 |
| KR | 20040026935 | 4/2004 |
| WO | 0230094 | 4/2002 |

OTHER PUBLICATIONS

Danielsen, P.J., "The Promise of a Voice-Enabled Web," IEEE, Software Technology, Aug. 2000, pp. 104-106.

(Continued)

*Primary Examiner* — Michael T Vu
(74) *Attorney, Agent, or Firm* — Lee & Hayes, PLLC

(57) ABSTRACT

Methods and systems for capturing and tracking call information relating to a call from a user to a merchant are provided. According to one embodiment of the disclosed subject matter, a request for a call to a merchant from a user on a device is received and a data connection is initiated with a call analytics platform over which user information is sent from the device to the platform. A unique number allowing the device to call the platform is then passed back to the device. The device calls the platform, call context data is captured, and the call is processed to the merchant. Information relating to the user and merchant call is tracked and logged.

20 Claims, 15 Drawing Sheets

(56) References Cited

U.S. PATENT DOCUMENTS

| | | |
|---|---|---|
| 6,404,884 B1 | 6/2002 | Marwell et al. |
| 6,411,946 B1 | 6/2002 | Chaudhuri |
| 6,487,277 B2 | 11/2002 | Beyda et al. |
| 6,544,428 B1 | 4/2003 | Higashi |
| 6,580,904 B2 | 6/2003 | Cox et al. |
| 6,584,146 B2 | 6/2003 | Bose et al. |
| 6,584,181 B1 | 6/2003 | Aktas et al. |
| 6,600,736 B1 | 7/2003 | Ball et al. |
| 6,625,444 B1 | 9/2003 | Fleming, III et al. |
| 6,654,428 B1 | 11/2003 | Bose et al. |
| 6,668,055 B2 | 12/2003 | Marwell et al. |
| 6,731,927 B1 | 5/2004 | Stern et al. |
| 6,792,082 B1 | 9/2004 | Levine |
| 6,801,763 B2 | 10/2004 | Elsey et al. |
| 6,816,578 B1 | 11/2004 | Kredo et al. |
| 6,816,727 B2 | 11/2004 | Cox et al. |
| 6,889,354 B2 | 5/2005 | Feldman et al. |
| 6,922,411 B1 | 7/2005 | Taylor |
| 6,985,961 B1 | 1/2006 | Ramsayer et al. |
| 6,990,189 B2 | 1/2006 | Ljubicich |
| 6,990,471 B1 | 1/2006 | Rajaram |
| 6,999,563 B1 | 2/2006 | Thorpe et al. |
| 7,031,724 B2 | 4/2006 | Ross et al. |
| 7,058,164 B1 | 6/2006 | Chan et al. |
| 7,065,188 B1 | 6/2006 | Mei et al. |
| 7,092,370 B2 | 8/2006 | Jiang et al. |
| 7,092,738 B2 | 8/2006 | Creamer et al. |
| 7,099,451 B1 | 8/2006 | Jordan et al. |
| 7,103,172 B2 | 9/2006 | Brown et al. |
| 7,127,400 B2 | 10/2006 | Koch |
| 7,142,661 B2 | 11/2006 | Erhart et al. |
| 7,184,534 B2 | 2/2007 | Birch et al. |
| 7,222,301 B2 | 5/2007 | Makagon et al. |
| 7,242,752 B2 | 7/2007 | Chiu |
| 7,263,177 B1 | 8/2007 | Paterik et al. |
| 7,286,985 B2 | 10/2007 | Chiu |
| 7,330,899 B2 | 2/2008 | Wong |
| 7,515,695 B1 | 4/2009 | Chan et al. |
| 8,498,405 B2 | 7/2013 | Siegrist |
| 8,755,503 B1 | 6/2014 | Kirchhoff et al. |
| 8,874,102 B2 | 10/2014 | Fisher et al. |
| 9,094,537 B2 * | 7/2015 | Kenington .......... H04M 3/2218 |
| 2002/0035633 A1 | 3/2002 | Bose et al. |
| 2002/0055351 A1 | 5/2002 | Elsey et al. |
| 2002/0143548 A1 | 10/2002 | Korall et al. |
| 2003/0005076 A1 | 1/2003 | Koch et al. |
| 2003/0032409 A1 | 2/2003 | Hutcheson et al. |
| 2003/0115288 A1 | 6/2003 | Ljubicich et al. |
| 2003/0119492 A1 | 6/2003 | Timmins et al. |
| 2003/0130864 A1 | 7/2003 | Ho et al. |
| 2003/0211845 A1 | 11/2003 | Lohtia et al. |
| 2003/0212558 A1 | 11/2003 | Matula |
| 2003/0216145 A1 | 11/2003 | Cox et al. |
| 2004/0015380 A1 | 1/2004 | Timmins |
| 2004/0023644 A1 | 2/2004 | Montemer |
| 2004/0029567 A1 | 2/2004 | Timmins et al. |
| 2004/0058710 A1 | 3/2004 | Timmins et al. |
| 2004/0120473 A1 | 6/2004 | Birch et al. |
| 2004/0132433 A1 | 7/2004 | Stern et al. |
| 2004/0156449 A1 | 8/2004 | Bose et al. |
| 2004/0156494 A1 | 8/2004 | Pines et al. |
| 2004/0166832 A1 | 8/2004 | Portman et al. |
| 2004/0198329 A1 | 10/2004 | Vasa |
| 2004/0203634 A1 | 10/2004 | Wang et al. |
| 2004/0209580 A1 | 10/2004 | Bose et al. |
| 2004/0220810 A1 | 11/2004 | Leask et al. |
| 2004/0247092 A1 | 12/2004 | Timmins et al. |
| 2004/0259535 A1 | 12/2004 | Elsey et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0003837 A1 | 1/2005 | Midkiff et al. |
| 2005/0037744 A1 | 2/2005 | Pines et al. |
| 2005/0038876 A1 | 2/2005 | Chaudhuri |
| 2005/0047560 A1 | 3/2005 | Mostad |
| 2005/0054333 A1 | 3/2005 | Johnson |
| 2005/0070260 A1 | 3/2005 | Mazzara |
| 2005/0074112 A1 | 4/2005 | Timmins |
| 2005/0276391 A1 | 12/2005 | Ibbotson |
| 2006/0117019 A1 | 6/2006 | Sylthe et al. |
| 2006/0221913 A1 | 10/2006 | Hermel et al. |
| 2006/0222019 A1 | 10/2006 | Hedin et al. |
| 2006/0222020 A1 | 10/2006 | Hedin et al. |
| 2006/0222054 A1 | 10/2006 | Conyers et al. |
| 2006/0222087 A1 | 10/2006 | Bauman et al. |
| 2006/0223468 A1 | 10/2006 | Toms et al. |
| 2006/0223514 A1 | 10/2006 | Weaver et al. |
| 2006/0223515 A1 | 10/2006 | Hermel et al. |
| 2006/0223572 A1 | 10/2006 | Hedin et al. |
| 2006/0227736 A1 | 10/2006 | Conyers et al. |
| 2006/0227737 A1 | 10/2006 | Hedin et al. |
| 2006/0227805 A1 | 10/2006 | Hedin et al. |
| 2010/0274670 A1 | 10/2010 | Sonnick et al. |
| 2011/0282730 A1 * | 11/2011 | Tarmas .............. G06Q 30/0243 705/14.42 |
| 2014/0324568 A1 | 10/2014 | Fisher et al. |

OTHER PUBLICATIONS

Office Action for U.S. Appl. No. 14/329,352, mailed on Nov. 6, 2014, Fisher et al., "Call Tracking System and Method", 15 pages.

Voice XML Forum, Version 1.00, Mar. 7, 2001, pp. 1-101.

* cited by examiner

CALL TRACKING SYSTEM AND METHOD

CROSS-REFERENCE TO RELATED APPLICATIONS

This application is a continuation-in-part of U.S. patent application Ser. No. 14/329,352, filed on Jul. 11, 2014, which is a continuation of U.S. patent application Ser. No. 13/279,162, filed on Oct. 21, 2011, which claims the benefit of U.S. Provisional Patent Application No. 61/442,423, filed on Feb. 14, 2011. The entire disclosures of each of the above applications are incorporated herein by reference.

FIELD OF THE INVENTION

The present disclosure relates in general to the field of call tracking and analytics.

BACKGROUND OF THE INVENTION

Often, clients spending money on advertisements require call tracking and analytics services to help evaluate their return on investment. Traditionally, this type of call tracking and analytics has utilized unique telephone numbers where a different telephone number is purchased for each advertisement. However, these telephone numbers cost clients and advertisers significant monthly fees and, in order to provide sufficient granularity to track which particular advertisement resulted in a sale, hundreds or thousands of unique phone numbers are required. Often, vast numbers of unique phone numbers are required because each advertisement, on each station, in each geographic region, and in each particular time slot requires a unique phone number to effectively track the efficacy that particular advertisement had on the user (i.e. whether a user calls a merchant or other entity due to the advertisement). For example, it has been reported that one company uses over 35,000 different phone numbers to track the effectiveness of its advertising and that one of the largest call tracking companies has purchased ten times the number of new phone numbers than one of the largest phone service providers. With each phone number costing as much as $1 to $2 per number per month in addition to the costly maintenance and operational problems associated with managing a large amount of phone numbers, advertisers and call tracking companies may have substantial expenditures as a result of the need for a large number of phone numbers.

BRIEF SUMMARY OF THE INVENTION

Therefore a need has arisen for a call tracking systems and methods which do not require a large number of phone numbers and decrease the costs of cost tracking providers. In accordance with the disclosed subject matter, call tracking systems and methods are provided which substantially eliminate or reduce disadvantages associated with previously developed call tracking systems and methods.

Methods and systems for capturing and tracking call information relating to a call from a user to a merchant or other entity are provided. According to one embodiment of the disclosed subject matter, a request for a call to a merchant or other such entity from a user on a device is received and a data connection is initiated with a call analytics platform over which user information is sent from the device to the platform. A unique number allowing the device to call the platform is then passed back to the device. The device calls the platform, call context data is captured, and the call is processed to the merchant. Information relating to the user and merchant call is tracked and logged.

In an example embodiment of the present disclosure, a method includes receiving, with a server, user information from a user device, the user information including a first identifier unique to at least one of the user device or a user of the user device, a second identifier indicating a particular content item rendered via the user device, and a third identifier indicating a sponsor that is associated with the particular content item and that is at least partly responsible for providing the particular content item. The method also includes receiving, with the server, a request from the user device to initiate a connection between the device and an entity corresponding to the particular content item. The method further includes, at least partly in response to receiving the request, establishing, via the server, a connection between the user device and a device of the entity, and capturing, with the server, call information associated with the connection, wherein the call information includes an audio recording corresponding to the connection. Such a method further includes generating an electronic call record corresponding to the connection, wherein the call record comprises the audio recording, and the first, second, and third identifiers.

In such an example embodiment, the entity comprises a first entity and the sponsor comprises a second entity different from the first entity, the user information is sent via a mobile device application operable on the user device, and/or the first identifier comprises at least one of an account code of the user, a name of the user, an address of the user, a serial number of the user device, or a telephone number of the user device. Additionally, in such an example embodiment, the audio recording comprises a recording of a conversation between a first user operating the user device and a second user operating the device of the entity, and/or the call information comprises at least one of a start time of the connection, an end time of the connection, a connection duration, a telephone number of the user device, a telephone number of the entity, or an indication of an input received via the user device while the connection was active. Further, in such an embodiment the method may also include at least one of storing at least one of the first identifier, the second identifier, or the third identifier in a database associated with the server, and retrieving the at least one of the first identifier, the second identifier, or the third identifier at least partly in response to receiving the request, disabling the connection between the user device and the device of the entity, and generating the electronic call record at least partly in response to disabling the connection, or providing, via the server, the electronic call record to at least one of the sponsor or the entity.

In another example embodiment of the present disclosure, a method includes receiving, with a server, a request from a user device to initiate a connection between the user device and an entity corresponding to a particular content item rendered via the user device. Such an example method also includes, at least partly in response to receiving the request, establishing, via the server, a connection between the user device and a device of the entity, and capturing, with the server, call information associated with the connection, wherein the call information includes an audio recording corresponding to the connection. Such an example method also includes disabling the connection between the user device and the device of the entity, receiving, with the server, user information from the user device, the user information including a first identifier and a second identifier, wherein the first identifier is unique to at least one of the user device or a user of the user device, the second identifier indicates at least one of the particular content item rendered via the user device or sponsor that is at least partly responsible for providing the particular content item, and the user information is received by the server while the connection is active or after the connection has been disabled. Such an example method further includes generating an electronic call record corresponding to the connection, wherein the call record comprises the audio recording, the first identifier, and the second identifier.

In such an example embodiment, the user information comprises information stored via a mobile device application operable on the user device and at least partly in response to an input received via the user device during or after the particular content item has been rendered. Additionally, in such an embodiment the user information is received by the server at least partly in response to the connection being disabled. Further, in such an embodiment the first identifier comprises at least one of an account code of the user, a name of the user, an address of the user, a serial number of the user device, or a telephone number of the user device, and the audio recording comprises a recording of a conversation between a first user operating the user device and a second user operating the device of the entity. In such examples, the server receives the audio recording from the user device. Additionally, in such an embodiment the call information comprises at least one of a start time of the connection, an end time of the connection, a connection duration, a telephone number of the user device, a telephone number of the entity, or an indication of an input received via the user device while the connection was active. Moreover, in some examples such an example method also includes storing at least one of the first identifier or the second identifier in a database associated with the server, wherein generating the call record comprises retrieving the at least one of the first identifier or the second identifier from the database.

In still another example embodiment of the present disclosure a system includes a server computer, and a computer-readable memory storing instructions that, when executed by the server computer, cause the server computer to perform steps. In such an embodiment, the steps include receiving user information from a user device, the user information including a first identifier unique to at least one of the user device or a user of the user device, a second identifier indicating a particular content item rendered via the user device, and a third identifier indicating a sponsor that is associated with the particular content item and that is at least partly responsible for providing the particular content item. The steps also include establishing, via the server computer, a connection between the user device and a device of an entity corresponding to the particular content item. The steps further include capturing call information associated with the connection, wherein the call information includes an audio recording corresponding to the connection. The steps also include generating an electronic call record corresponding to the connection, wherein the call record comprises the audio recording, and the first, second, and third identifiers.

In the example system described above, the user information is received by the server computer while the connection is active or after the connection has been disabled. Additionally, the user information comprises information stored via a mobile device application operable on the user device and at least partly in response to an input received via the user device during or after the particular content item has been rendered. Further, in the example system described above the steps further include storing at least one of the first identifier, the second identifier, or the third identifier in the computer-readable memory, receiving a request from the user device to initiate the connection between the user device and the device of the entity, and retrieving the at least one of the first identifier, the second identifier, or the third identifier at least partly in response to receiving the request.

These and other embodiments and aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages that are included within this description, be within the scope of any claims filed later.

BRIEF DESCRIPTIONS OF THE DRAWINGS

The features, natures, and advantages of the disclosed subject matter may become more apparent from the detailed description set forth below when taken in conjunction with the drawings in which like reference characters identify correspondingly throughout and wherein.

Figure 8:
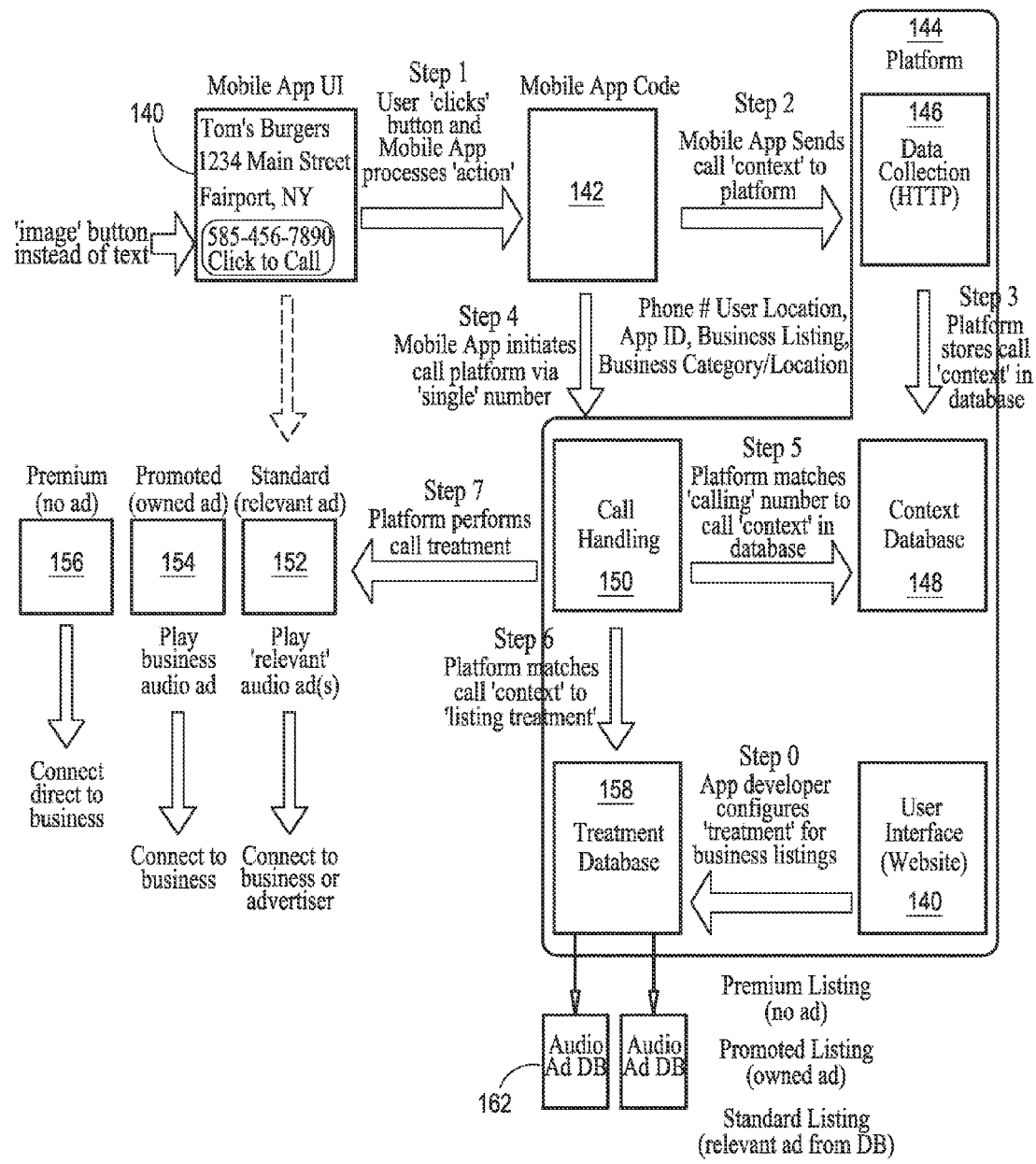
Figure 12:
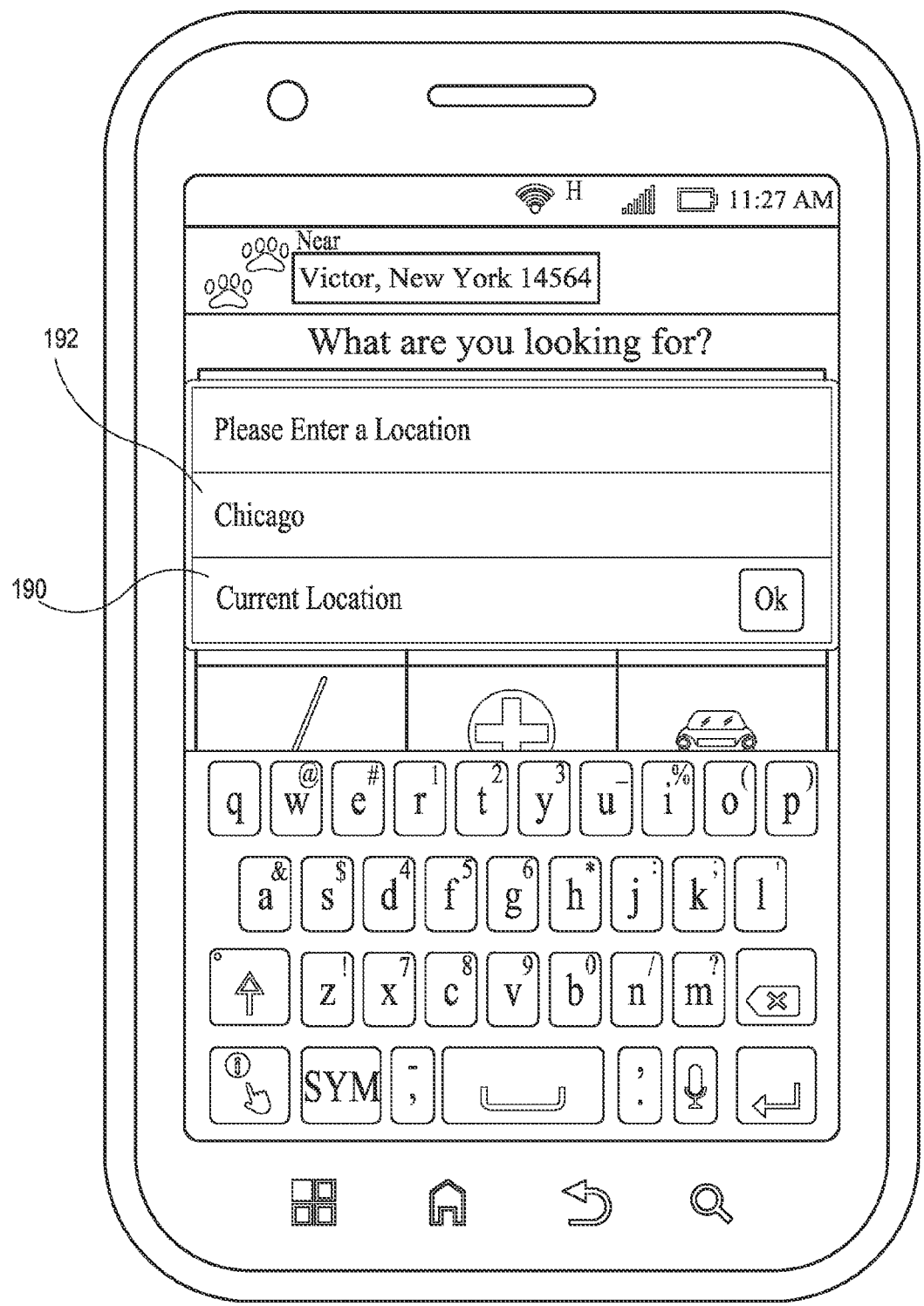
Figure 13:
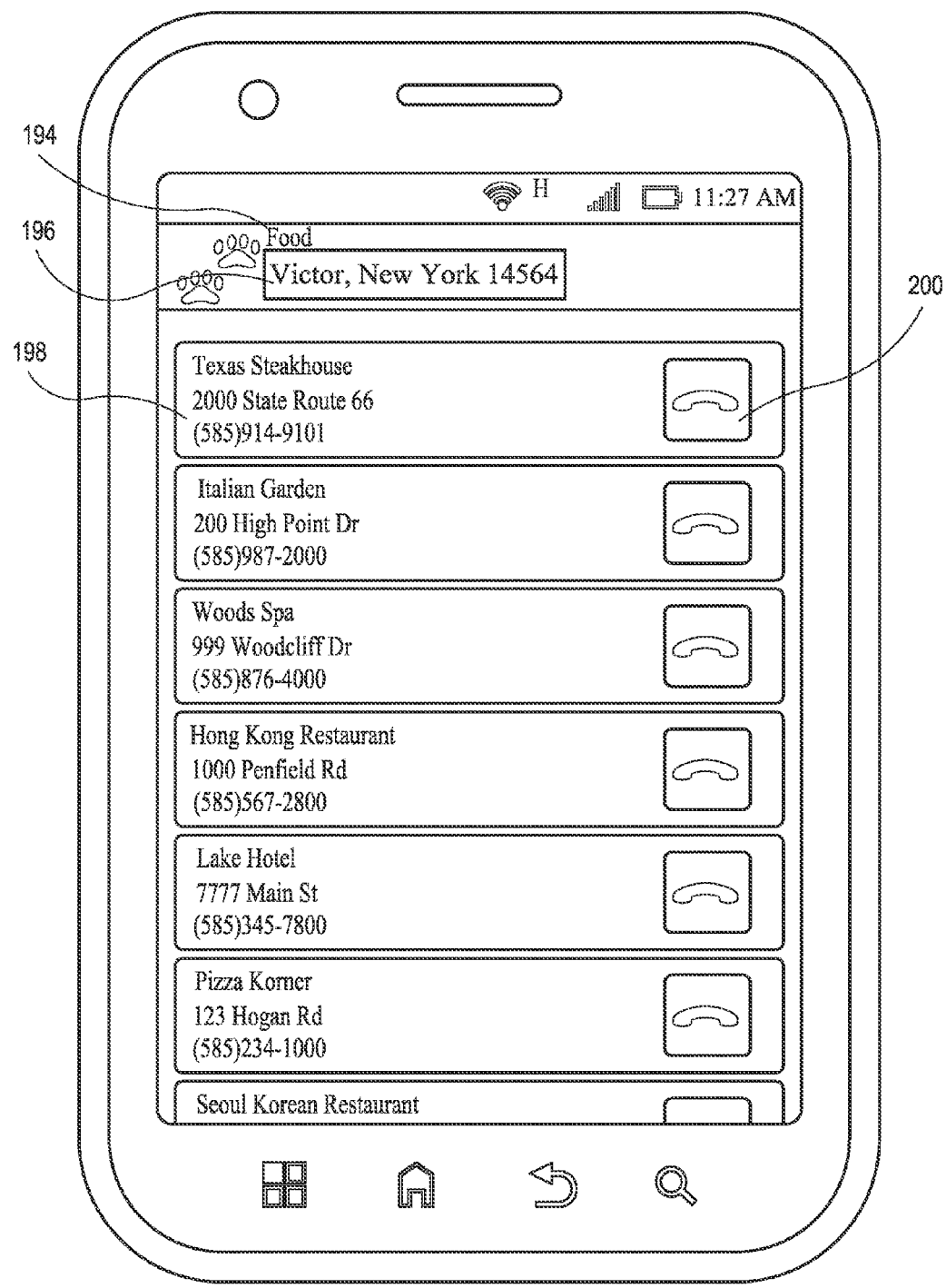
Figure 14:
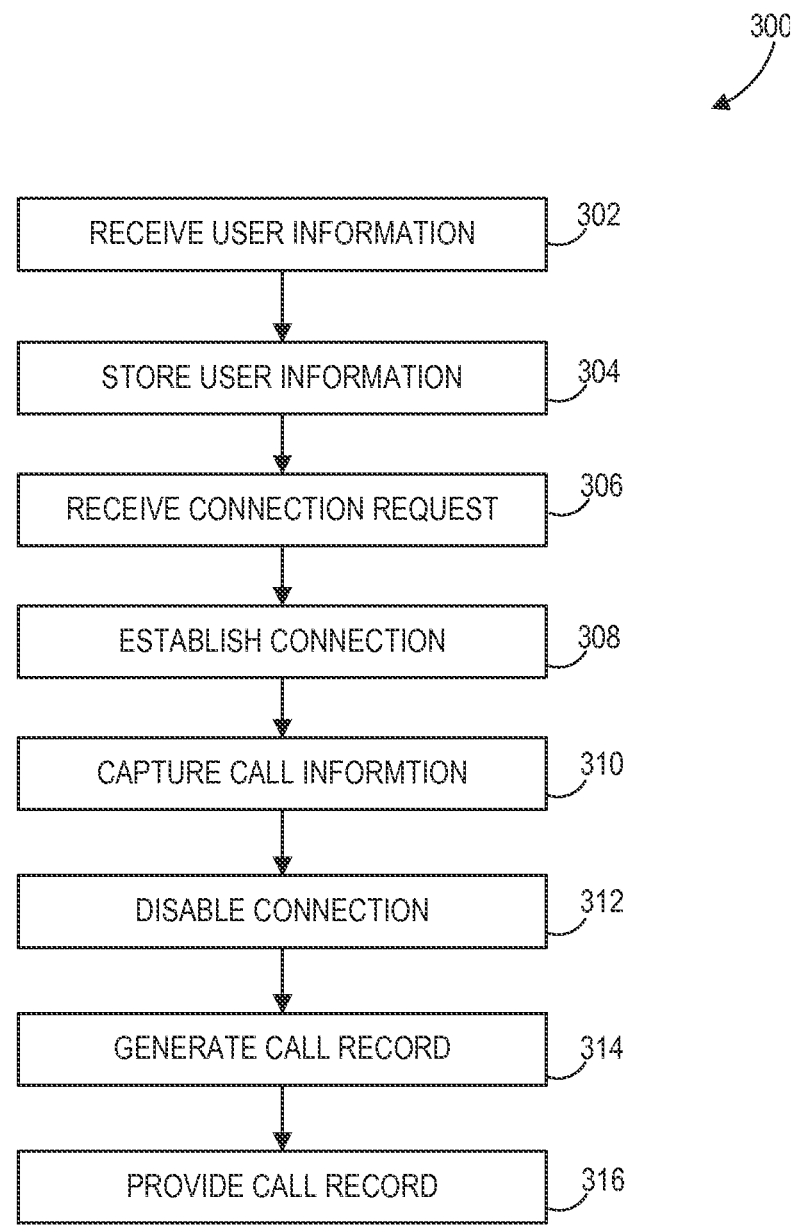

FIG. 8 is a graphic representation of an embodiment of the call tracking system architecture showing an example of the process flow of information in response to a call request; and FIGS. 9-13 are diagrams representative of mobile phone screenshots showing an example of a local mobile search publishing interface presented to a mobile device user to initiate a call request and initiate tracking FIG. 14 is a flow diagram illustrating another example method of the present disclosure.

Figure 15:
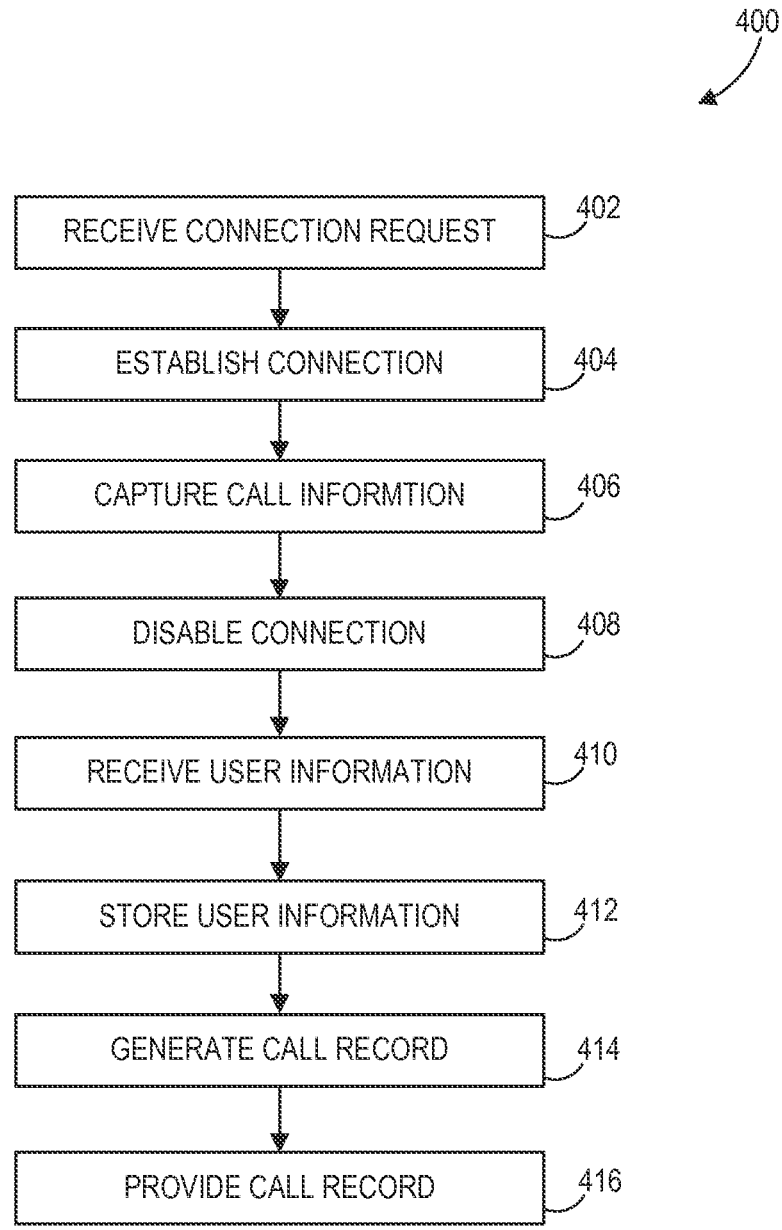

FIG. 15 is a flow diagram illustrating still another example method of the present disclosure.

In the figures, like elements should be understood to represent like elements, even though reference labels are omitted on some instances of a repeated element, for simplicity.

DETAILED DESCRIPTION OF ILLUSTRATIVE EMBODIMENTS

The following description is not to be taken in a limiting sense, but is made for the purpose of describing the general principles of the present disclosure. The scope of the present disclosure should be determined with reference to the claims. Exemplary embodiments of the present disclosure are illustrated in the drawings, like numbers being used to refer to like and corresponding parts of the various drawings.

And although described with reference to the tracking and analytics of a call using a mobile smartphone, a person skilled in the art could apply the principles discussed herein to various devices and various forms of calling technologies including VOIP.

In the following disclosure, the terms "customer" and "advertiser" are used interchangeably to define the client responsible for presenting the image to the user on the device, such as a mobile application developer, search engine developer or local search publisher, or the merchant corresponding to the image itself. In some examples, such a customer or advertiser may comprise a sponsor, such as an advertisement sponsor, that is at least partly responsible for providing a particular advertisement or other content item to the user and/or via the user device. The term "merchant" is used to indicate the goods or service provider whom the user requests to contact. In some examples, a merchant may comprise one or more entities whom the user requests to contact during or after consuming a particular content item via a user device, and such entities may be actual human beings, companies, partnerships, corporations, for-profit organizations, non-for-profit organizations, agencies, or any other provider of goods or services of any kind. The term "device" is used throughout this disclosure to indicate any call enabling machine allowing a user to request a call. Thus the term device, for example, specifically includes smartphones, mobile browsers, IVR (interactivevoice response units), tablets, laptops, and desktops. The term "user" is used to indicate the requestor of the information and can be a person or IVR unit (interactive voice response unit). Further, the term "advertisement" is used throughout the disclosure to indicate any call generating source, including traditional device advertisement media such as banner ads, search ads, and also search results, links, or any other image or text that a user may select to request a call. In some examples, an advertisement may comprise a content item rendered via a device of the user.

Although discussed above with reference to an application, nearly any other mobile environment may be used to initiate the call tracking, such as: applications, browsers, phone calls, SMS (short messaging service), MMS (multimedia messaging service), cameras, IVR (interactive voice response), etc. Finally, although discussed throughout with reference to a call analytics platform, the same goals may be reached without an interception platform through the use of telecom provider information (e.g. access to the carrier's information), on-site hardware (e.g. hardware installed at the advertiser's location), or through the use of some other legal intercept platform.

The disclosed systems and methods provide for precise call tracking, logging, and monitoring without requiring thousands of unique phone numbers and associates viewership of certain content with the receipt of phone calls. A call analytics platform documents when selected or monetized content is displayed on a device and associates the viewership of that content with related phone calls from the device on which the content was displayed. A metric commonly used in advertising, this allows agencies to track the effectiveness and response to their advertisements in a mobile environment. The information gathered allows the platform to properly and securely associate advertisement viewing to a specific user. Additionally and separately the disclosed method and system retrieves phone call data. The combination of the two data sets, information related to the device and user information (device user data) and phone call data (call context data) enables the platform to associate information (such as advertisements) viewed on the device (e.g. a smart phone or pda) to calls received for a merchant from the same device. For example, a user looks at a pizza restaurant advertisement on her phone and then calls the same pizza restaurant—thus the role the advertisement played in motivating that phone call is captured by the disclosed subject matter.

In other disclosed embodiments each advertisement does not need a unique telephone number in order to track which advertisement generated the contact and/or sale. The disclosed subject matter may also allow advertisers to manage and monitor their advertising campaigns through a web interface. Another aspect allows advertisers to list the real phone number of the companies they represent instead of using fake destination numbers. And yet another aspect of the disclosed subject matter is to capture lost revenue from later placed calls, end users calling the "other" number, and manual calling, among other things.

Figure 1:
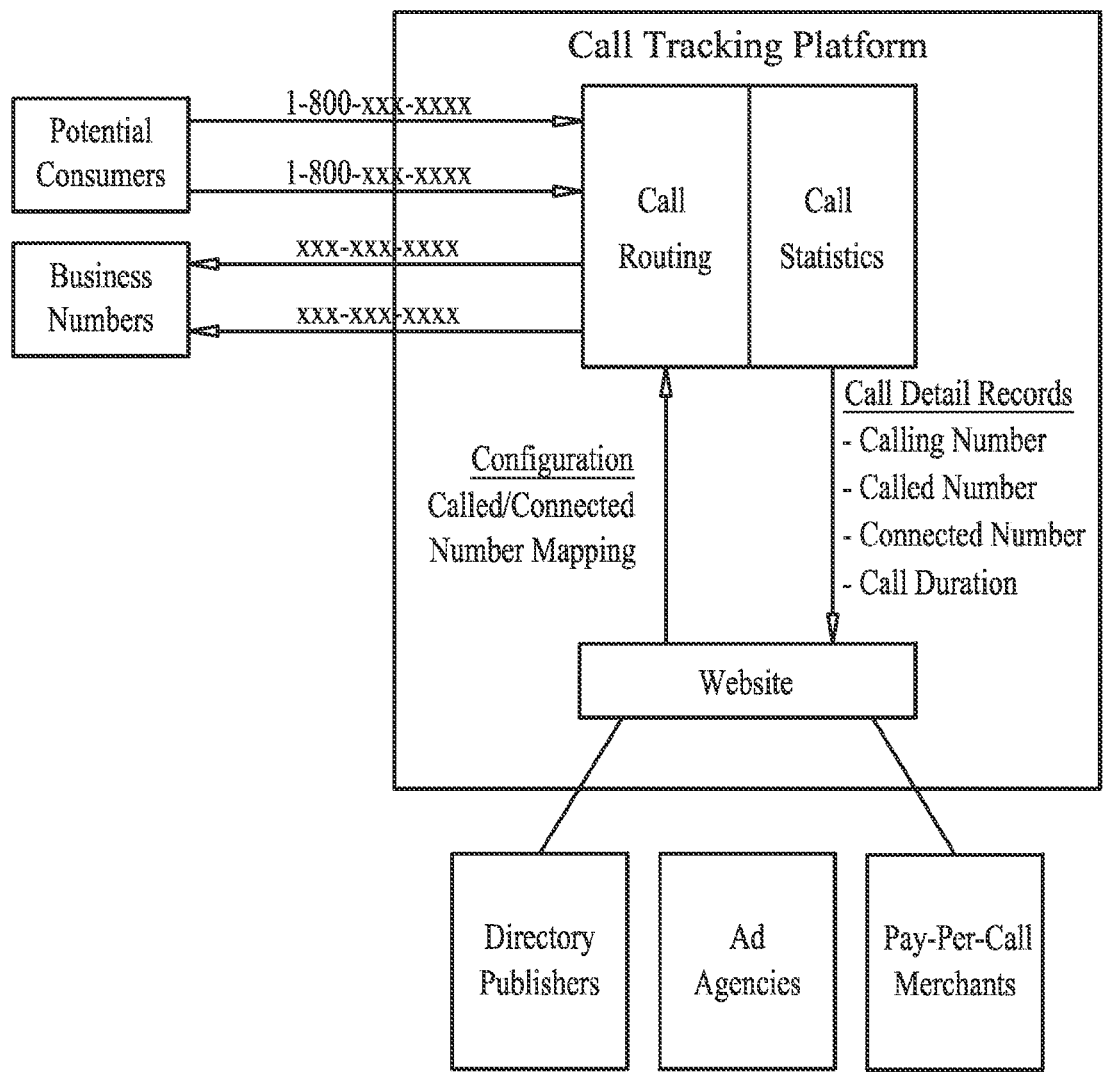
FIG. 1 (PRIOR ART) is a graphic representation of an embodiment of a current system architecture.

FIG. 1 is a graphic representation of a system architecture showing a traditional process flow for call tracking. As shown in FIG. 1, every advertisement requires a different unique telephone number. A potential consumer dials the number associated with the particular advertisement and/or other particular content item that is rendered, 1-800-XXX-XXXX, and the call goes through the telephone network and travels to a call routing component. Based on the phone number that was dialed, the call routing component polls the configuration information to determine which advertisement was associated with the dialed number and which business number the call should be routed to. The call routing component also passes information to the call statistics component which logs which phone number was called, what number called the phone number, call duration, and other tracking and logging criteria for reporting and billing purposes. The call routing component then connects the call to the advertiser or merchant (shown as Business Numbers in FIG. 1) via the telephone network.

In operation, the disclosed subject matter provides for numberless call tracking and routing (meaning calls based on advertisements may be tracked without dedicated tracking numbers) which significantly reduces the amount of phone numbers required to effectively track a user's call based on an advertisement.

FIGS. 2-6 are process flows of embodiments of the disclosed subject matter depicting major steps in handling, tracking, and logging of calls generated from a call request. The steps depicted in FIGS. 2-6 are consistent unless otherwise noted.

Figure 2:
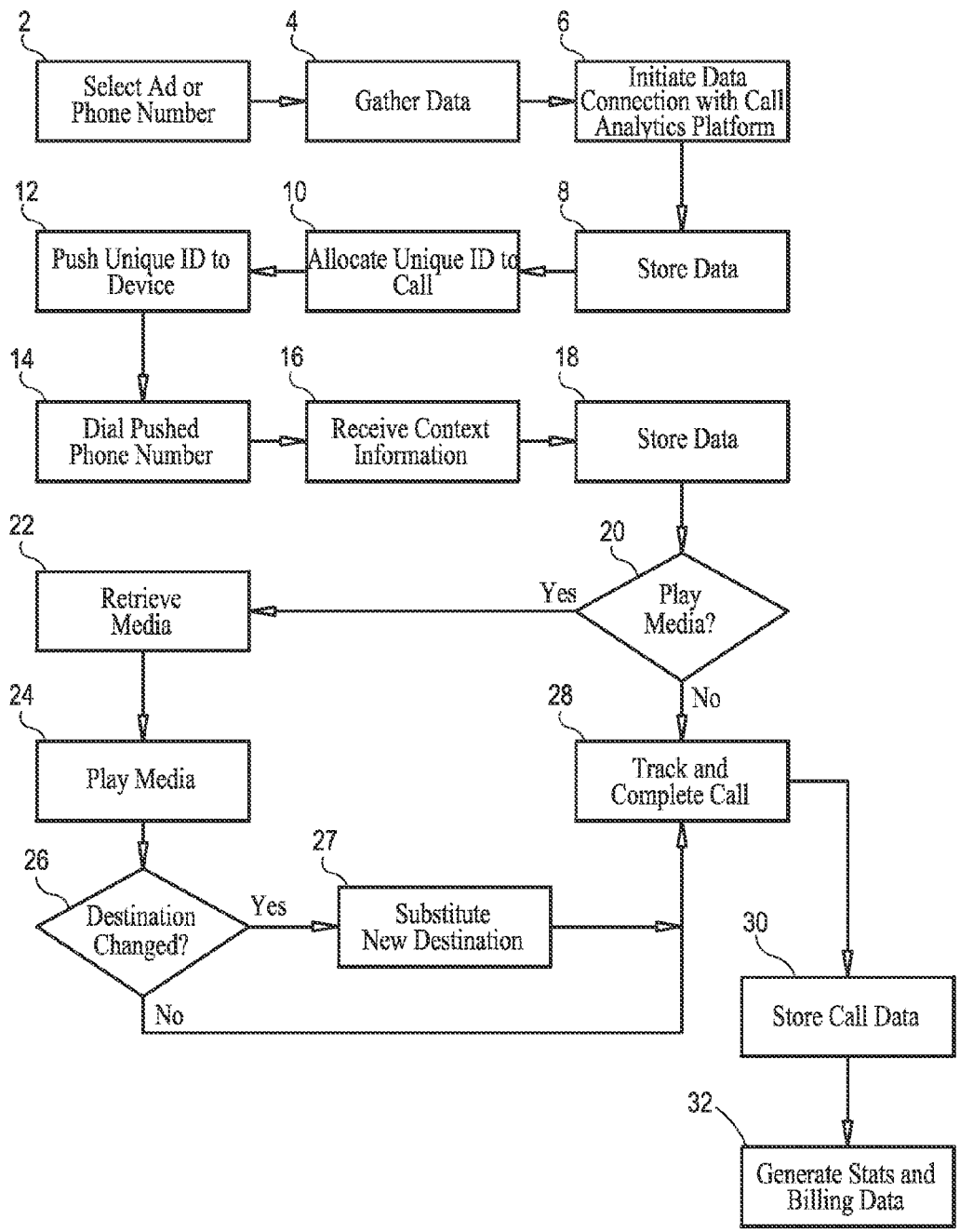
FIGS. 2-6 are process flows of embodiments of the disclosed subject matter depicting major steps in handling, tracking, and logging of calls generated from a call request.

FIG. 2 is a process flow of an embodiment of the disclosed subject matter depicting major steps in handling, tracking, and logging of calls generated from an advertisement (or any image). First, as shown in step 2, a user (for example, a user may be a person or an IVR—interactive voice response) selects an advertisement or a phone number on a device. The advertisement may, for example, come in the form of a mobile banner ad or mobile search ad displayed on a mobile phone in response to searching by the user. Next in step 4, an on-device application, which may be in the form of a mobile application or a plug-in, SDK, or API, gathers information about the device and the user generating the call. This information may include, but is not limited to, the originating phone number, time, date, GPS location, IMEI (International Mobile Equipment Identity) number, advertisement identifier, advertisement interaction (e.g. click, call, or impression), advertisement placement (e.g. application name, website, search term, application identifier), personal preferences, or previous interactions. Additionally, this information may be gathered using known methods including, but not limited to, buttons, button masking a number (displaying the phone number of a business in a graphic as opposed to text), form fields, cookies, application history search, browser transmitted information, caller information fields, application specific data, OS services, saved profiles, or IVR prompts.

Then, as shown in step 6, a data connection (which may be, for example, an HTTP POST of a XML document) is initiated between the mobile device and a call analytics platform. The customer, such as the specific mobile application developer, is identified by the call analytics platform according to the information captured by the on-device application (or application plug-in, SDK, or API) and verified to be a valid customer. The customer's specific business tracking rules and requirements are applied to the call tracking request to determine the call's eligibility for tracking. If the identified customer is eligible for tracking, the data is then stored in a database associated with the call analytics platform, step 8.

In step 10, a unique ID is allocated to the specific information request based on information such as the availability of the originating phone number (e.g. whether it is or is not an unlisted or private number), the type of device from which the request was made, OS of the device, and the availability of SIP over the mobile network. Further, the unique ID may be assigned to the specific information request using standard telephony capabilities to associate user data with a call (e.g. ISDN user data). This unique ID may be a telephone number, SIP user ID, or other mechanism used to tie the request data to the phone call. If it is a telephone number, the number may only be unique for a pre-determined timeframe (e.g. from the point of the posting of the data until the call arrives at the platform while still allowing the original user to re-dial and be connected to the correct merchant for a period of time) after which the number can be re-allocated and recycled for another call—this is called a temporary unique ID.

The unique ID is then pushed back to the device so a call may be initiated to the call analytics platform, as shown in step 12.

In step 14, the device then pushes the call to the call analytics platform using the unique ID. The call analytics platform receives the call from the device and call context information relating to the call, as shown in step 16. Call context data may include, for example, information such as the unique ID or dialed number, caller's number, etc. The context data is then stored in a database associated with the call analytics platform in step 18.

In step 20, based on the device user data and the context data it is determined whether media (such as, for example, an audio advertisement, menu options, welcome greeting, or branding message) will be played to the caller before connecting the phone call to the requested merchant, or whether media will be played to the merchant with information about the caller (such as location, source of the call, requested information, etc.) before connecting the caller. If an audio advertisement is to be played, the call analytics platform determines whether the audio advertisement is an "owned" advertisement or not—an "owned" advertisement is an advertisement owned by the application which provided the original advertisement to the user which initiated the phone call. Importantly, an owned advertisement does not have to advertise the application itself or a good/service related to the requested merchant but rather may advertise any product or service. If there is no owned advertisement to play then another advertisement may be provided which could be used to promote anything including a competitor of the original advertisement that initiated the first contact.

The call analytics platform then retrieves the appropriate media, step 22, and plays it to the user, step 24. Optionally, the media may allow the user to select an alternate destination to be transferred to (such as alternate vendor, business extension, or merchant location). For example, during the advertisement the user may be prompted to press any key to be connected with the alternate vendor, shown as step 26. If the alternate vendor is chosen ("yes"), the alternate vendor's phone number is substituted as the destination number, step 27 otherwise the call is completed to the destination and tracked, step 28. The call information is maintained and stored either during the call or shortly thereafter, as shown in step 30. Additional tracking and analytic information may include, for example, the length of call, a recording or a transcription of the call, or other information.

In step 32, the analytic information which is captured and stored may then be distributed according to wide a variety of methods, including but not limited to, thick or thin clients, displayed on a web based interface, extracted and emailed to a customer, or exported to another analytic platform (e.g Salesforce, CRM, Google, etc.)

FIGS. 3-6 provide four embodiments of the disclosed subject matter depicting major steps in handling, tracking, and logging calls generated from an information request in which the steps depicted are consistent with those in FIG. 2 unless otherwise noted.

Figure 3:
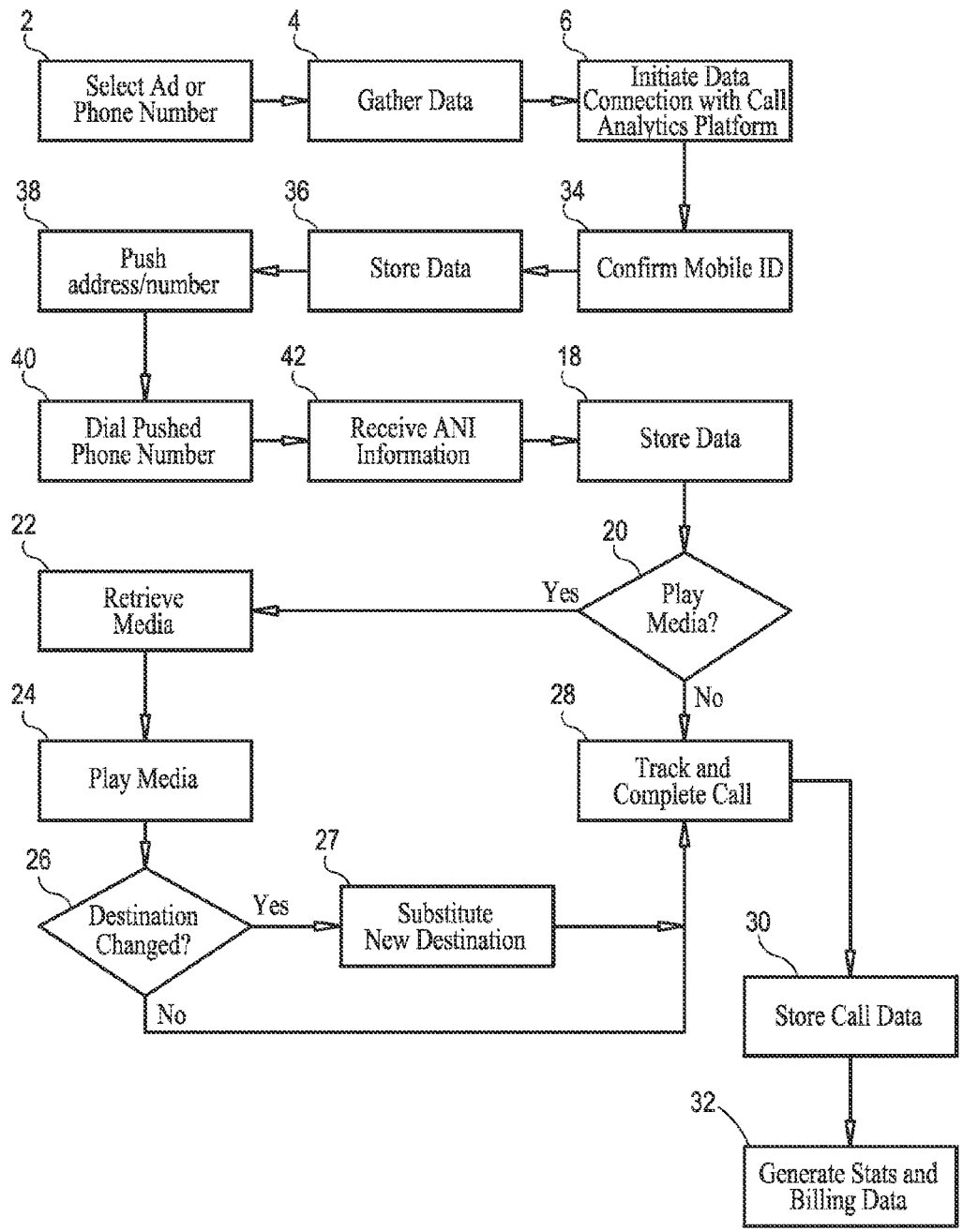

FIG. 3 is a process flow of an embodiment of the disclosed subject matter utilizing automatic number identification (ANI). An advantage of the disclosed ANI system is simplicity—when the call analytics platform receives a call it is matched to the Caller ID of the device, step 34 "Confirm Mobile ID", and the call information is stored, step 36, and sent/pushed via the internet to the device, step 38. However, a commercial disadvantage of this embodiment is that utilizing ANI has limited terms of service in certain mobile application markets and limitations with respect to caller ID blocking. The system receives the mobile number from the data push before the call, makes the call in step 40, and then receives the ANI information on receipt of the call, step 42. By matching the mobile number and ANI information, calls may be tracked without rotating numbers at all—allowing for the use of static regional numbers and reducing load by up to 99%.

Figure 4:
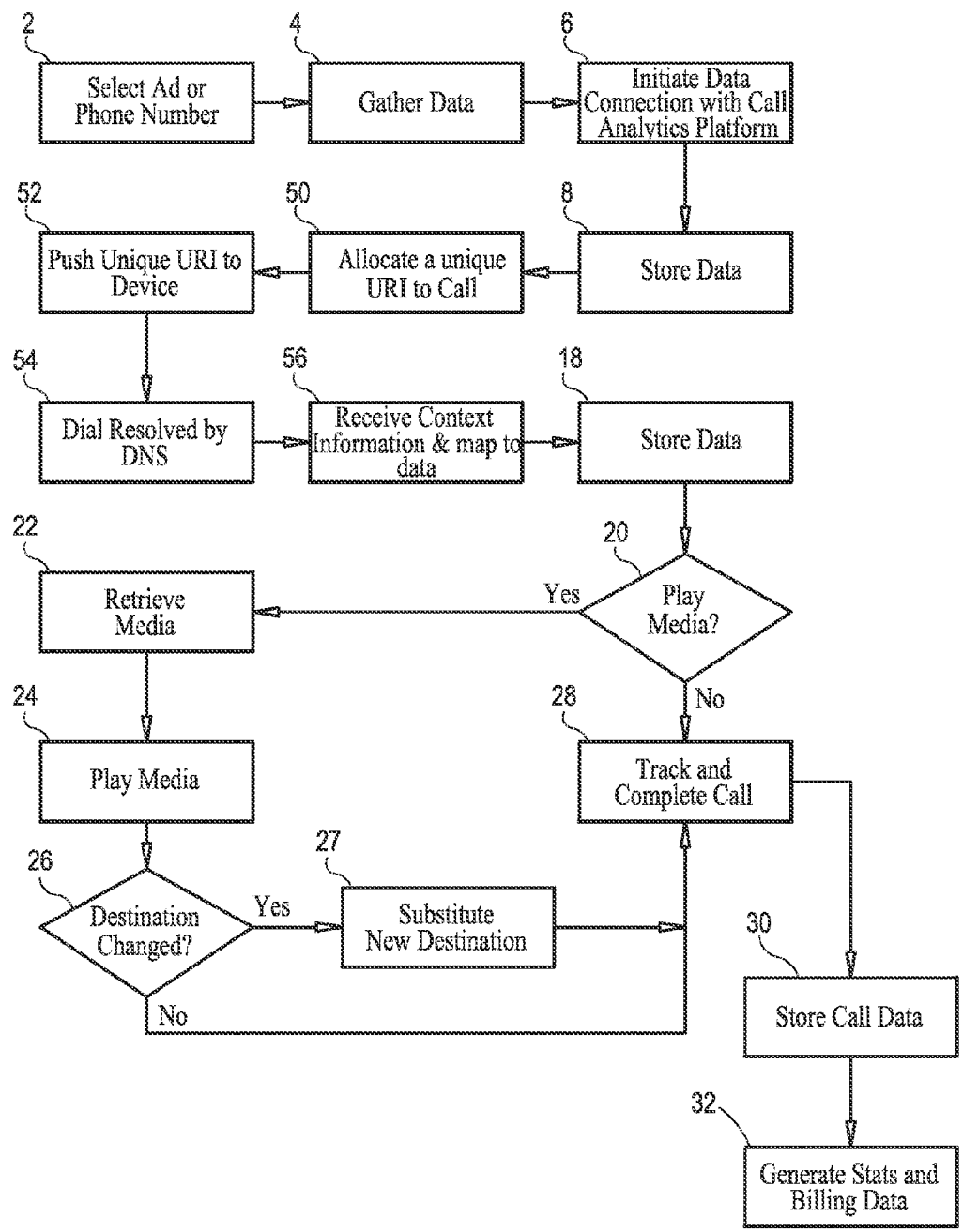

FIG. 4 is a process flow of an embodiment of the disclosed subject matter utilizing session initiation protocol (SIP). This SIP implementation embodiment varies from FIG. 2 in that each call tracking request is assigned a unique SIP URI in response to the data push/impression, step 50. The SIP URI (uniform resource identifier) is then pushed to the device, step 52, and used to initiate a SIP Session with the call analytics platform, step 54. The platform receives call context information and maps that information to the stored call data, 56 This embodiment may be significantly more cost effective but also relies on a device data connection function and high quality internet. Importantly, because URI addresses are free and unique calls may be tracked with increased granularity (a different number for every call), this method has an unmeasured increase in specificity over one number per variable chosen to track.

Alternatively, the disclosed subject matter may utilize session initiation protocol (SIP) and interactive voice response (IVR). The IVR Server/SIP implementation varies from FIG. 4 in that each information request, such as the selection of a merchant advertisement, is assigned a SIP URI address (by impression or relationship) to initiate a call after the data push. This requires another automated call handling system (e.g. 411, menus, any robot or IVR that talks to a caller) to interface with the call analytics platform. One advantage to this system is that because URI addresses are free, calls may be tracked with increased granularity by using a different number for every call, which allows for an unmeasured increase in specificity over one number per variable chosen to track—thus decreasing costs.

Figure 5:
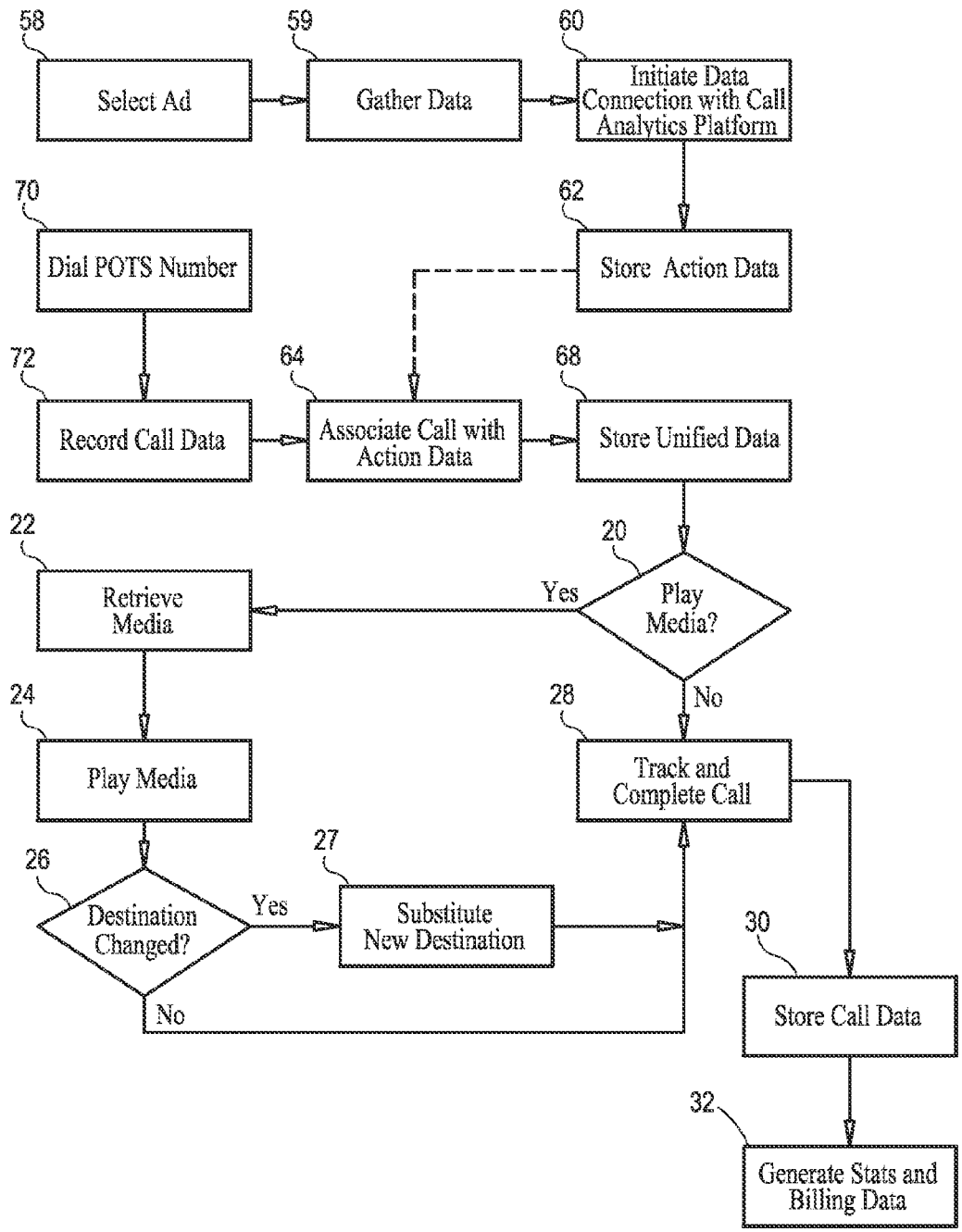

FIG. 5 is a process flow of an alternative embodiment of the disclosed subject matter. In this total tracking embodiment, a key variation from FIG. 2, 100% of the calls to a merchant (which may be a company or individual) are tracked by reassigning the destination of their published number to the call analytics platform. Thus, in operation, every call placed to the destination will be processed through the call analytics platform first, before being connected to the merchant. This allows for a direct relationship with an end business, rather than with a service provider, wherein all incoming calls are received and handled by the call analytics platform then passed on to the business.

A user may select an advertisement for the merchant on a smartphone, step 58, or call the merchant directly, step 70. In the event the merchant's plain old telephone service number is dialed, step 70 and the call is intercepted by the call analytics platform and the call data recorded, step 72. Call information is captured from a variety of sources including internet, mobile, and cellular tracking systems to identify who and why each of those calls took place. This information is recorded, step 72, and used to associate the call with action data, step 64.

In the event the user selects an advertisement for the merchant on a smartphone, step 58, action data such as user actions on a website billboard, QR code, or NFC are captured (such as through search engine analytics services), step 59, and sent to the call analytics platform, step 60, and stored, step 62 The action data is associated with call data (all the information pulled by the call analytics platform during the call, step 72), in step 64. Unified data, the combination of action data and call data, is then stored in a database associate with the call analytics platform in step 68. Thus, the requested business may be provided with call tracking on every call (recording, quality management, customer service training) without the need for tracking numbers—providing an increase in information volume and a more holistic look at what actions generated calls.

Figure 6:
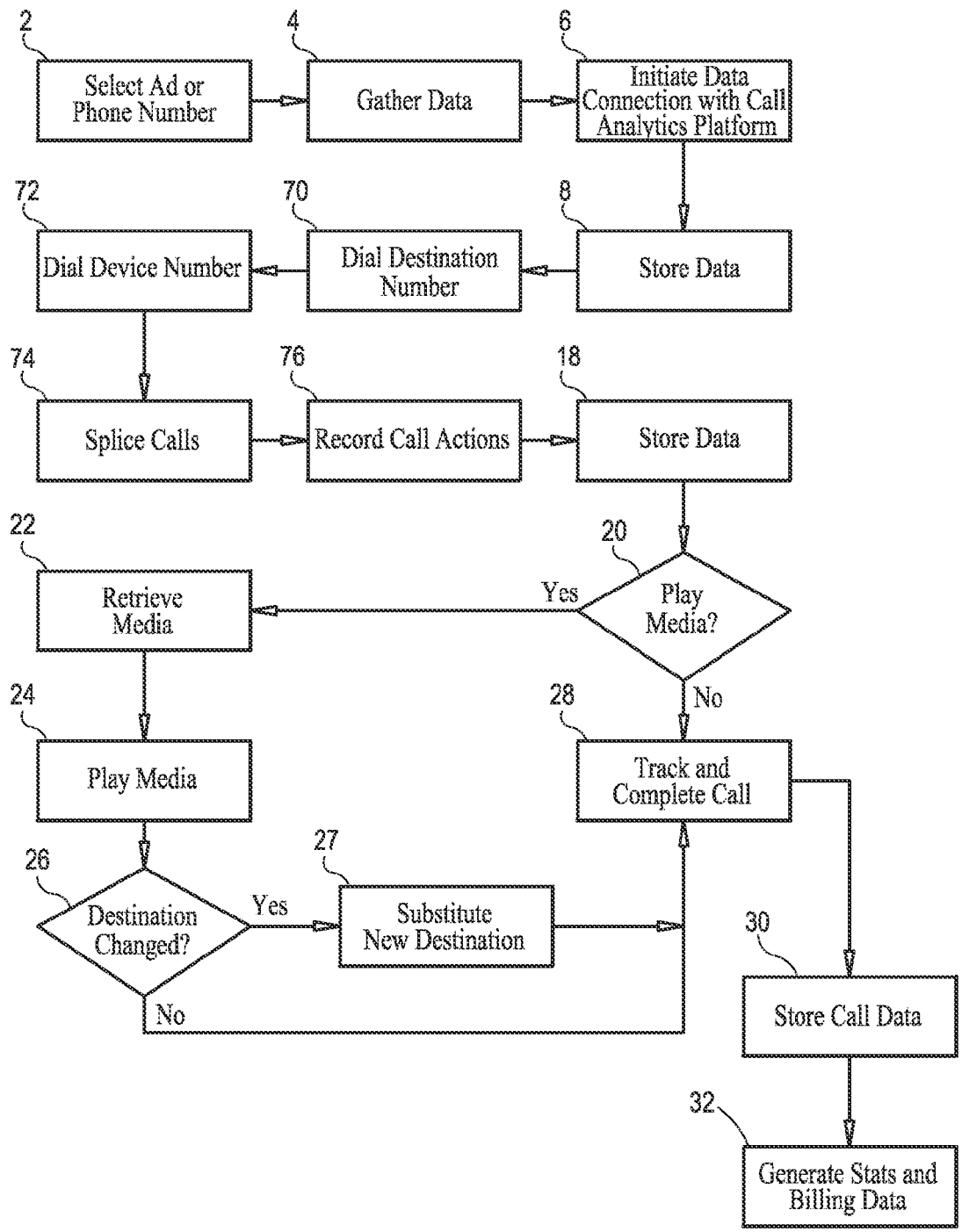

FIG. 6 is a process flow of another alternative embodiment of the disclosed subject matter. This system operates by placing two outbound calls from a central server. One call goes to the consumer, step 72, and one call goes to the merchant, step 70. An advantage of this two outbound call system is simplicity—when a call tracking request is received via the data connection of any device, the call analytics platform dials the destination number, step 70, and the device trying to reach that destination, step 72. Steps 70 and 72 are performed simultaneously—similar in operation to a conference call. The calls are spliced, step 74, and the call analytics platform records and stores the call action data, steps 76 and 18 respectively.

This system receives the mobile number and destination number from the data push before the call. By using outbound dialing, user information and call tracking data is tied together at the beginning of the call and information is not required to be associated together from different steps of the process after the call has been connected. Utilizing this embodiment, calls are tracked without rotating numbers which reduces or eliminates failures based on Caller ID blocking, redials, call history, and missing data errors. However, commercial disadvantages include the terms of service limitations between smart phone manufacturers and wireless carriers as some wireless carriers do not allow SIP over their 3G network.

Figure 7:
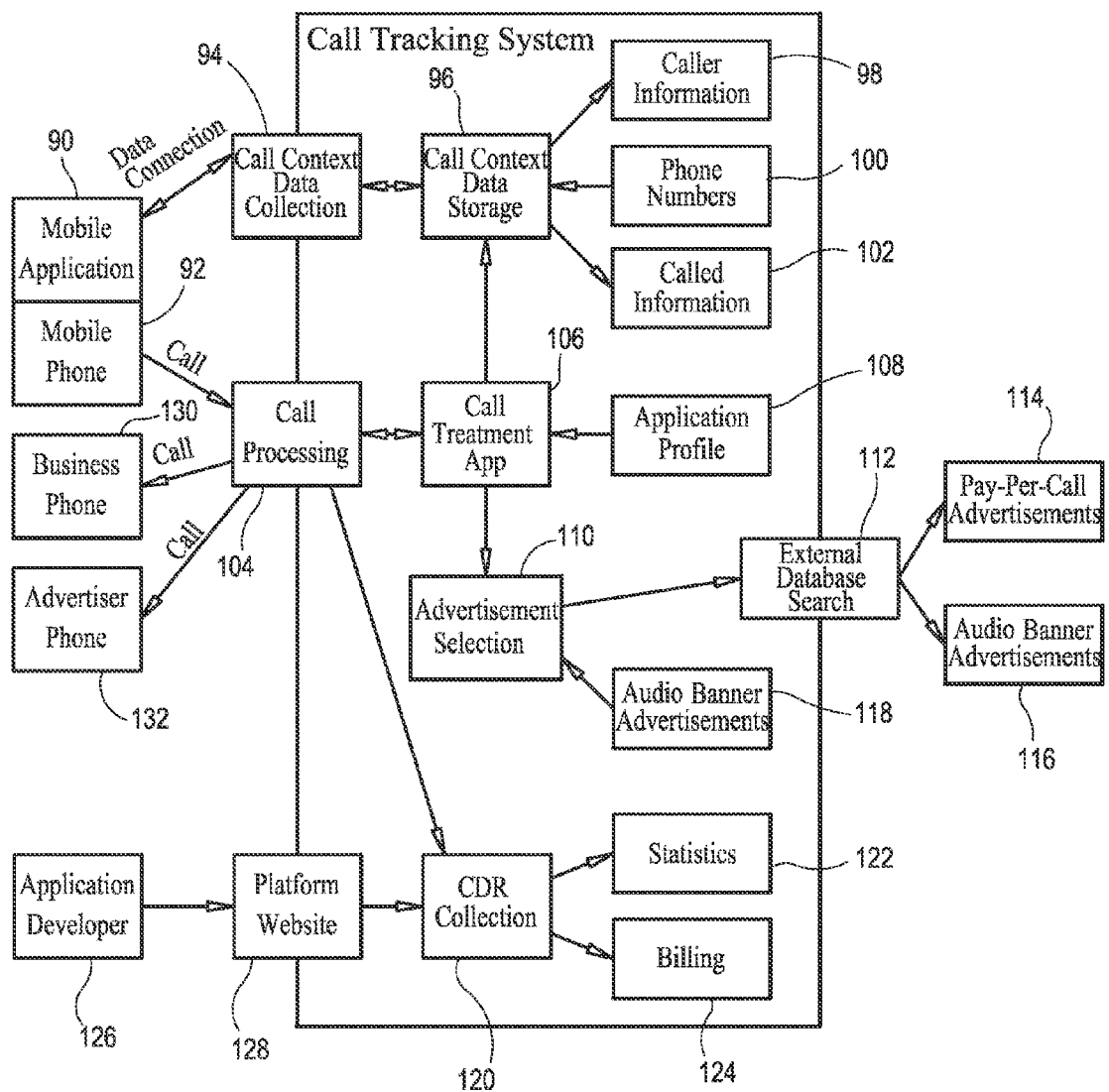
FIG. 7 is a graphic representation of an embodiment of the call tracking system architecture showing an example of the process flow of information in response to a call request.

FIG. 7 is a graphic representation of an embodiment of the call tracking system architecture showing an example of the process flow of information in response to a call request. First, mobile application 90 is installed on mobile device 92. Then the user of the mobile device is shown an image of a merchant phone number on the mobile application. When the user selects the phone number, a data connection is initiated and data is transferred over the connection and collected by call context data collection component 94, to the call tracking system. This call context data processing occurs slightly before the call to the advertiser is actually completed; however, it is all but transparent to the user. The call context data is then stored in call context data storage 96. As an illustrative example, caller information 98 and called information 102 is stored as call context data (information such as phone number of the user, phone number attempting to call, application number or ID, advertiser number or ID, time, GPS location). A call analytics phone number, selected from phone numbers 100, is then transferred back to mobile phone 92 and mobile phone 92 dials the call analytics phone number. The call is then routed to call processing area 104 which polls call treatment application 106 to determine how to treat the call. Importantly, the call processing and routing may utilize PSTN, SIP, or other known audio processing.

Application profile system 108 feeds information to call treatment application 106 so call treatment application 106 can determine how to handle the current call. In one embodiment, application profile system 108 is a database connected to a user web interface where advertising agencies or independent advertising clients may monitor and configure their advertising campaigns. If call treatment application 106 determines no intermediate audio advertisement (e.g. audio banner) is to be played, call processing system 104 connects mobile phone 92 to the advertising business phone number—business phone 130. However, if call treatment application 106 determines an intermediate audio advertisement (e.g. an audio banner advertisement) is appropriate, advertisement selection system 110 is polled to provide the intermediate audio advertisement. This intermediate audio advertisement may be pulled from an internal database, shown as internal audio banner advertisements 118, or external database of advertisements using external database search component 112. In one embodiment, the external database is comprised of audio advertisements provided by the application manufacturer, such as pay-per-call advertisements 114 and audio banner advertisements 116, and internal audio banner advertisements 118 are provided when the external database does not have an appropriate intermediate audio advertisement—for example if the end user has selected an advertisement for a local pizza company; the external database is searched, but has no intermediate audio advertisement relating to pizza companies; the internal database is polled to find a pizza company audio banner to play. The intermediate audio advertisement is then played to the user. Depending on the user's actions (e.g. did the user indicate a desire to connect to the intermediate audio advertiser) the call is connected either to the original requested merchant's, business phone 130 or the intermediate audio advertiser's business phone number, advertiser phone 132.

As the call proceeds, additional information is gathered and passed to call detail record collection system 120 which tracks statistics 122 (e.g. number of times the advertiser's business phone was called; length of call; number of times this particular mobile device has called; which application delivered the user; which advertisement in the application generated the contact; how long the call lasted; record the call for later transcription, to monitor if a sale resulted, or for other purposes; etc.). Call detail record collection system 120 transfers information to billing component 124 to properly invoice the client for the service.

In one embodiment, there is also provided application developer interface 126 via platform website 128 which allows developers to monitor the statistics and billing for their application, advertisements, and clients.

FIG. 8 is a graphic representation of an embodiment of the call tracking system architecture showing an example of the process flow of information in response to a call request. From the user's viewpoint, there is only one continuous uninterrupted call, however the outbound calls depicted in FIG. 8 are performed at substantially the same time. In this embodiment, the mobile application provides an advertisement to a user. The phone number of the business is displayed to the user on mobile device 140; however, the phone number is an image button instead of text. The image is used to keep the device's operating system from detecting the number and usurping the application's tracking component by dialing the number. When the user clicks the phone number to call the advertising business, mobile application code 142 on the device gathers and transfers data (e.g. phone number of mobile device, IMEI of mobile device, IP address of mobile device, phone number of advertising business, advertisement ID, application ID, etc.) via an HTTP data connection to the data collection component 146 on calling platform 144. Data collection component 146 stores the data in context database 148.

Mobile application 142 then connects the mobile device to call handling component 150. Mobile application 142 accomplishes this by dialing a call analytics phone number instead of the advertiser's business phone number. Additional context information is gathered, stored, and used to match the incoming phone call with a previous data connection. Additional unique identifier information may also be transferred during the data connection or at another time. Additional unique identifier information may include, for example, a device thumbprint, MEID (Mobile Equipment Identifier) number, IMSI (International Mobile Subscriber Identity) number, or the mobile device's model number.

Call handling component 150 then polls treatment database 158 for an intermediate audio advertisement and if one is available, pulls the intermediate audio advertisement from the audio database (such as Audio Ad DB 162 as shown in FIG. 8). The intermediate audio advertisement selected (e.g. audio banner) is then played to the caller. Importantly, the call processing and call routing may utilize PSTN, SIP, or other known audio processing.

In this embodiment, user interface 140 is provided to the advertiser to configure intermediate audio advertisements including uploading the advertisement and configuring when the audio advertisement should play. This may also include an auction style system such that the highest bidder's advertisement plays.

As shown in FIG. 8, there are three possible outcomes when polling the treatment database: retrieve and play a standard audio banner 152; retrieve and play a promoted audio banner 154; or connect directly to the original advertiser's business phone number 156. A promoted audio banner is one provided by the application developer and may be pulled from the application developer's audio banner database. A standard audio banner is one pulled from the internal database of advertisements Having two such databases of audio banners allows an advertisement to be pulled from the internal database to "fill in" the gaps in the application developer's database in the cases where the application developer does not have a relevant advertisement.

Figure 9:
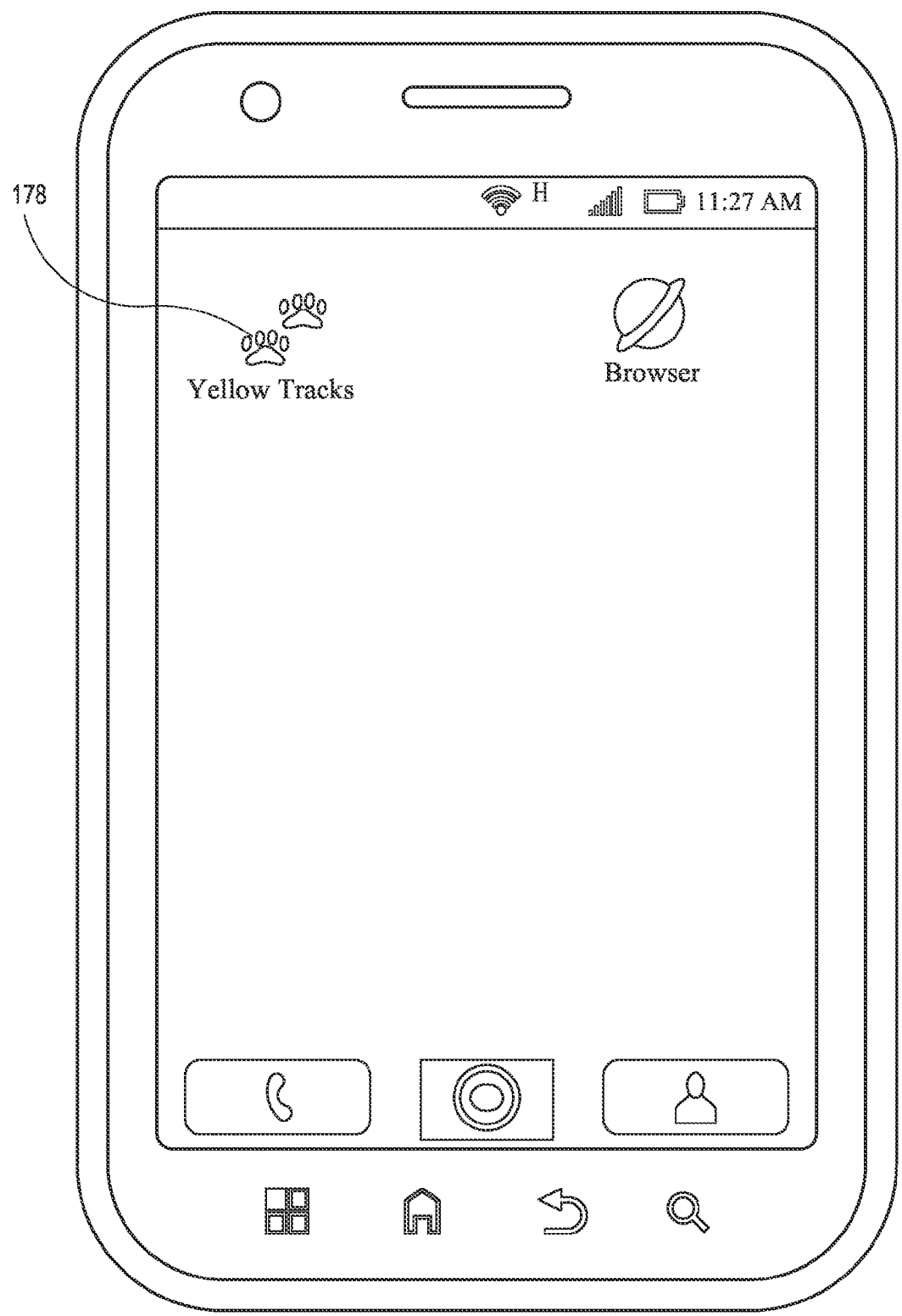

FIGS. 9-13 are diagrams representative of mobile phone screenshots showing an example of local mobile search publishing interfaces presented to a mobile device user to initiate a call request in accordance with the disclosed subject matter—thus FIGS. 9-13 show an example of a mobile application product utilizing the disclosed systems and methods. FIG. 9 is an initial device interface allowing the user to initiate mobile application Yellow Tracks 178.

Figure 10:
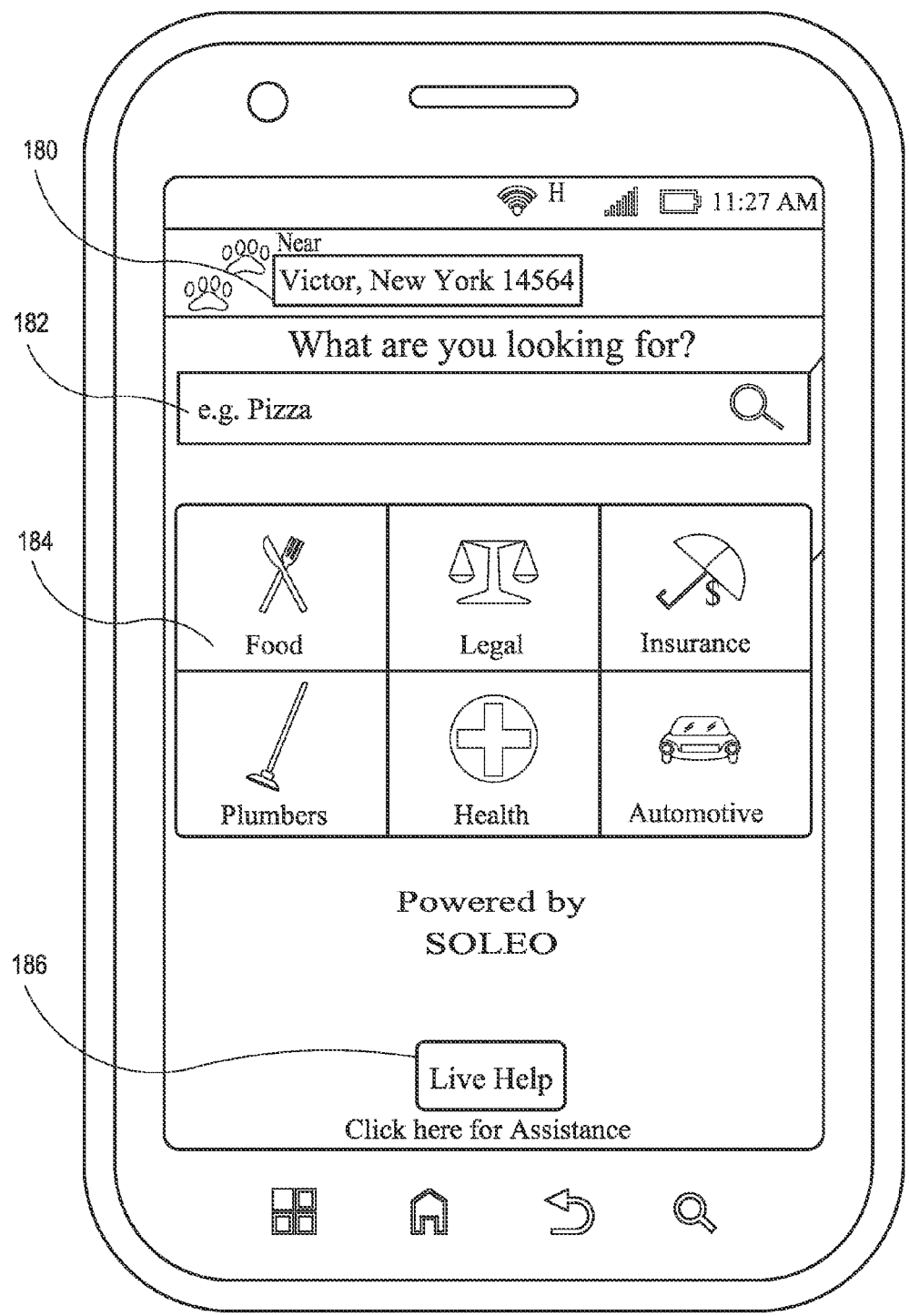

In FIG. 10, the user has opened the mobile search application and the application has automatically detected the device's location, "Victor, N.Y." Button 180 may also be selected to change or update the location. A user may search for business listings according to location, business category, business name, or other common search identifiers. Search field 182 allows a user to search for a specific listing or a general category. Clickable categories 184 allows a user to quickly and easily select commonly used search categories for local businesses. Selecting help button 186 initiates alive directory help session.

Figure 11:
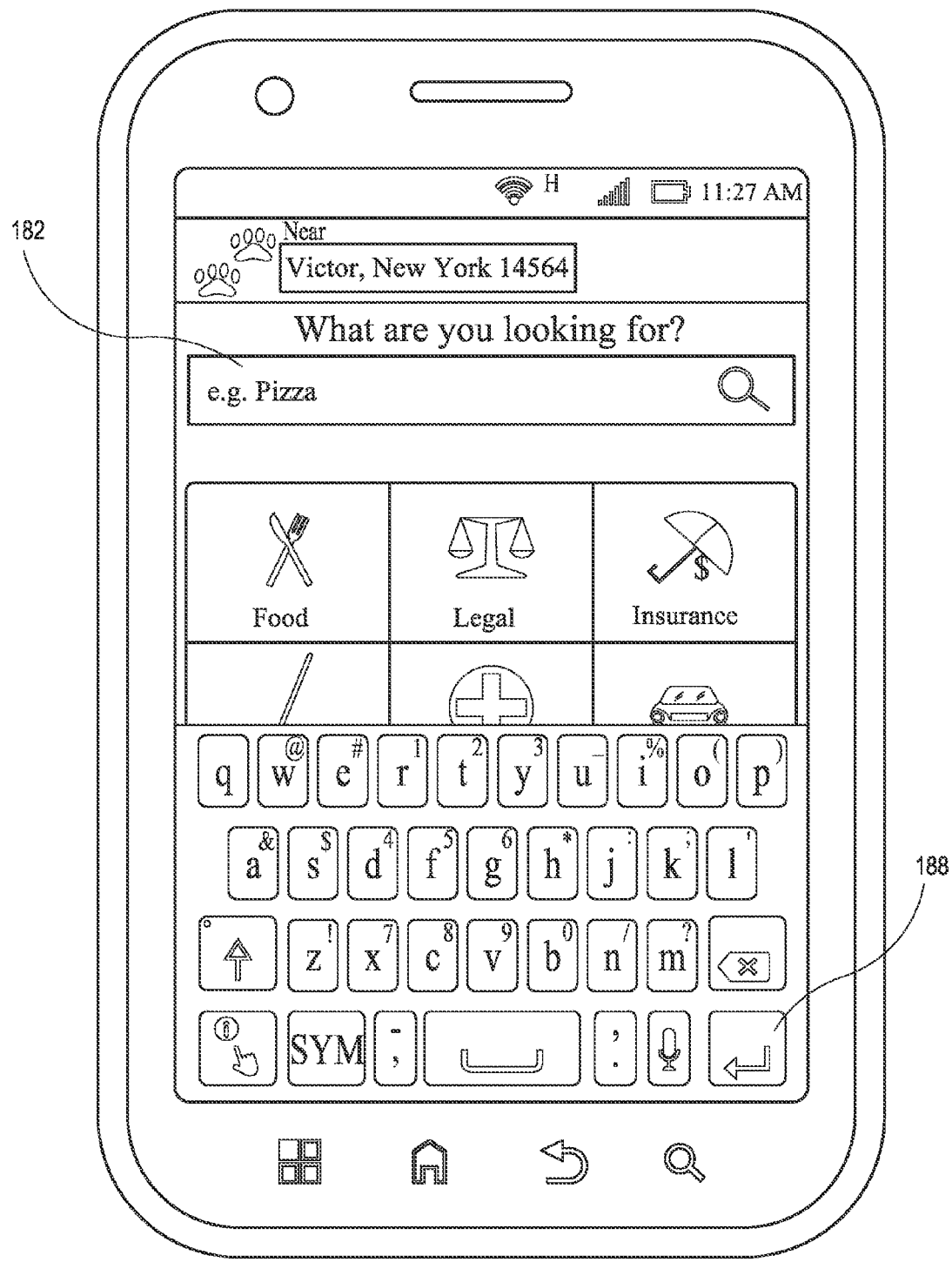

FIG. 11 shows the same initial search screen after the user has manually entered a search term in search field 182 and now may start the search by pressing enter 188 on the touch key pad. FIG. 12 allows the user to search for a listing in a different city. The user may press current location button 190 to update the GPS finder to the device's current location or enter the location/city the user would like to search for a listing in location field 192.

FIG. 13 is a result screen showing presenting the results from the users search. As shown, the user has searched for "Food" 194 in "Victor, New York" 196. The search results, such as search result 198, are presented with calling buttons, such as calling button 200, which allow the user to call the corresponding business listing by clicking on the calling button. Thus, the user is able to effectively search and contact business listings. Selecting a calling button is an example of a user initiating a calling request for a merchant, step 2 in FIG. 2. Alternatively, the interface may display the actual number listings as an image or the user may call a business listing by saying the business name. In operation, from the user's viewpoint after a calling button is selected the user is seamlessly connected to the requested merchant during which corresponding media may be played, step 20 in FIG. 2.

In operation, the disclosed subject matter provides a call tracking and logging system whereby a user selects an advertisement or listing on a mobile device. Data is gathered about the device and the advertisement, transmitted to a call analytics platform via a data connection, and stored on the platform. If the mobile device's phone number is unavailable, the system pushes a unique ID to the device; otherwise, the standard call analytics phone number is provided. The device dials the call analytics phone number but lists the advertiser's phone number in the call history. Upon connection to the call analytics platform, additional context information is stored. Based on the information/data received, the system determines whether to play an audio banner advertisement. If played, the caller is provided the option of being connected with the alternate vendor. After the call is connected, the call is monitored for duration and other statistics and/or recorded for transcription or other purposes.

FIGS. 14 and 15 provide flow charts illustrating further example methods of the present disclosure. In any of the embodiments described herein, the example methods illustrated by the flow charts of FIGS. 14 and 15 may be performed by one or more of the systems, components, platforms, or other items described above with respect to FIGS. 1-13. Further, one or more of the steps included in the flow charts shown in FIGS. 14 and 15 may include, may be similar to, and/or may be the same as one or more of the steps described above with respect to FIGS. 1-13.

FIG. 14 illustrates a method 300 for handling, tracking, and/or logging calls generated based on an advertisement or any other image presented by a device. As noted above, such a device may comprise any call enabling machine such as, for example, a smart phone, a mobile browser, and IVR, a tablet, a laptop, a desktop, or any other such machine. Similarly, as described above, such an advertisement may include any call generating source, such as a banner ad, a search ad, search results, and/or any other image or text that a device user may select in order to request placement of a call. At step 302, one or more servers, processors, databases, and/or other components of a call analytics platform may receive user information from the device. Such user information may include, for example, an identifier unique to at least one of the device or a user of the device (e.g., at least one of an account code of the user, a name of the user, an address of the user, a serial number of the user device, or a telephone number of the user device). Such information may also include, for example, an identifier indicating a particular advertisement and/or other particular content item rendered via the device. In still further examples, such information may include an identifier indicating the customer, mobile application developer, mobile application sponsor, or other such entity responsible for designing and/or presenting the particular advertisement and/or other particular content item on the device. For example, such a sponsor or customer may be responsible for generating the particular advertisement and/or other particular content item. Additionally and/or alternatively, such an advertisement sponsor or customer may be responsible for generating an on-device application, plug-in, API, SDK, or other program operable on the device to provide the particular advertisement, content item, or other content via the device. In general, such a sponsor associated with the particular content item may be at least partly responsible for providing the content item to the user and/or via the device.

At step 302, the server and/or other components of the analytics platform may receive such information in response to the user providing input via the device indicative of a desire by the user to initiate a call. Such inputs may include, for example, one or more touch inputs received via a touch screen, button, icon, and/or other component of the device. In response to receiving such an input, the on-device application may send one or more signals to the server or other components of the analytics platform including such information. Such signals may be sent wirelessly, via one or more networks, and/or via any other known methods.

Further, the information received at step 302 may include, among other things, any of the information described above with respect to step 4 of FIG. 2, and such information may be gathered using any of the methods describes with respect to FIG. 2. The information, related to the device and/or the user, received at step 302 may further include one or more indications that, at some point in time, the particular advertisement and/or other particular content item was rendered on and/or otherwise provided by the device. Such information may be provided, along with an identification of the sponsor or other customer associated with the particular advertisement, content item, etc., regardless of the actual timing of a call or other connection request provided by the user device. For example, at step 302 the on-device application may provide, and the server and/or other component of the analytics platform may receive, information indicating that the particular advertisement and/or other particular content item was rendered via the user device even if the user does not provide a direct input (e.g., a touch input via the device where the user clicks on or otherwise selects the advertisement) while the particular advertisement and/or other particular content item is rendered. In such examples, the device may render a particular advertisement, image, text, video, script, audio, a combination thereof, and/or any other content item. At some time after the advertisement and/or other particular content item has been rendered, the user may dial a telephone number, navigate to a website, and/or otherwise request a connection, via the device, with the merchant and/or other person or entity corresponding to the particular advertisement/content item. At step 302, the on-device application may provide information indicative of such transactions associated with the particular advertisement and/or other particular content item to the server and/or other components of the analytics platform. Such information may be provided in real time, or alternatively, may be provided periodically in one or more groups or packets of information.

In any of the embodiments described herein, at step 302 the on-device application may provide one or more items of information to the server, and each item may correspond to an individual respective transaction associated with the advertisement. In such examples, a first transaction may include rendering the advertisement and/or other particular content item on the device, and second separate transaction may include receiving one or more touch inputs from the user wherein the user swipes, scrolls, and/or otherwise interacts with the rendered advertisement and/or other content item, and a third separate transaction may include receiving one or more touch inputs from the user where the user clicks on or otherwise selects the advertisement and/or other content item. Receiving such individual items of information may assist the analytics platform in attributing credit, responsibility, and/or payment to the correct respective customer, sponsor, telephone number, or other entity when appropriate.

At step 304, the information received at step 302 may be stored in a database associated with the server. For example, such information may be stored in one or more databases associated with the call analytics platform, and such databases may comprise one or more components of the analytics platform. Further, at step 304 the server and/or other components of the analytics platform may generate a unique ID based on the originating phone number of the user device, the type of device from which the information described above was received, and/or any of the other factors described above with respect to step 10 of FIG. 2. In such examples, at step 304 the server and/or other components of the analytics platform may store the information received at step 302 together with the unique ID such that the unique ID is associated with and/or otherwise tied to the information within the database. Additionally, at step 304, the unique ID may be pushed back to the user device such that any call and/or other connection request sent from the device to the analytics platform may include the unique ID. As noted above with respect to step 10 of FIG. 2, such a unique ID may comprise, among other things, a telephone number, SIP user ID, or other mechanism used to link, for example, a phone call or other connection request to the user device and/or to a telephone number associated with the user device.

At step 306, the server and/or other components of the analytics platform may receive a call or other like request from the user device to initiate a voice, data, Internet, network, and/or other connection between the device and a merchant or other destination corresponding to the particular advertisement rendered via the device. Such a request may include, for example, the unique ID described above with respect to step 304. Such a request may also include context information associated with the request. Such information may include, for example, the telephone number dialed to the user, the telephone number associated with the user device, a particular website and/or other network portal selected by the user, and the like. The unique ID and/or any of the additional context information received at step 306 may be utilized by the analytics platform to identify the user providing the request and/or the user device from which the request is being sent. For example, at step 306 the server and/or other components of the analytics platform may identify the unique ID associated with the connection request, and may utilize the identified unique ID to retrieve the information stored at step 304.

At step 306, the server and/or other components of the analytics platform may also determine the manner in which the received connection request should be processed and, in particular, the analytics platform may determine which of one or more actions to take at least partly in response to receiving the request. For example, at step 306 the server may determine whether an audio advertisement, a menu option, a greeting, messages, media, and/or other content will be provided to the user, via the user device, prior to connecting the call to the merchant associated with the particular rendered advertisement and/or other particular content item. The server and/or other components of the analytics platform may make such determinations based at least in part on one or more predetermined business rules.

At step 308, at least partly in response to receiving the connection request, the server and/or other components of the analytics platform may establish a connection between the user device and a device of the merchant or other entity associated with the particular advertisement and/or other particular content item rendered by the user device. For example, similar to step 28 described above with respect to FIG. 2, the call may be completed to the telephone number, website, and/or other destination, identified in the advertisement and/or other particular content item, via the analytics platform. As a result, and at least partly in response to receiving the connection request at step 306, the server and/or other components of the analytics platform may capture call information associated with the connection at step 310. In such examples, the call information captured at step 310 may include, among other things, an audio recording corresponding to the connection established at step 308. In such examples, the audio recording may comprise, for example, a recording of a conversation between a first user operating the user device and a second user operating the device of the merchant or other entity associated with the particular rendered content item. The call information captured at step 310 may further include, among other things, a start time of the call, an end time of the call, a duration of the call, an indication of one or more actions taken by the user, and via the user device, during the call, the destination telephone number, the telephone number of the user device from which the call was originated, the type of services offered by, for example, the analytics platform and/or the merchant during the call, a transcription of the call, and/or any other information related to the call. In some examples, the analytics platform may determine, at step 306 or step 308, which information to collect during step 310. For example, once the unique ID is identified by the analytics platform, the analytics platform may reference one or more business rules associated with the unique ID and indicating which information to capture at step 310. Such business rules may be stored in the database associated with the analytics platform. In some examples, such business rules may be associated with the unique ID corresponding to the call, the user device, and/or the user. Further, in some examples such business rules may be associated with the unique ID and/or may be based on the merchant or other entity corresponding to the particular advertisement and/or other particular content item rendered via the user device and with which the call is connected at step 308.

At step 312, the server and/or other components of the analytics platform may end the call and/or otherwise disable the connection between the user device and the device of the merchant. It is understood that at least some of the information described above with respect to 310 may also be collected by the server and/or other components of the analytics platform at step 312. For example, at least one of the call end time or the call duration may be determined by the analytics platform at step 312. Further, at step 310 and/or at step 312 any of the call and/or context information described above may be stored in the database associated with the analytics platform.

At step 314, the server and/or other components of the analytics platform may generate one or more electronic call records (commonly referred to as "call data records" or "CDRs") associated with the call and/or other connection established at step 308. In example embodiments, the call record may comprise one or more electronic files or other like packets of information, and such an electronic call record may include, among other things, at least one of the audio recording, the first identifier, the second identifier, or the third identifier described above. In some examples, the electronic call record generated at step 314 may include any of the user information described above with respect to step 302 and/or the unique ID described above. Additionally or alternatively, the electronic call record may include any of the call or context information described above with respect to steps 310 and 312. Further, as part of generating the electronic call record at step 314, the processor, server, and/or other components of the analytics platform may transform one or more data files associated with such collected information from a first (e.g., uncompressed) form or format to a second (e.g., compressed) format different from the first format. Such a transformation may, for example, reduce the memory space required in the database associated with the analytics platform to store such call records. Further, such a transformation may reduce and/or minimize the server and/or network resources required to process and/or transmit the electronic call record between users or between devices. Such a reduction in server and/or network resources may improve the overall performance of the analytics platform and/or one or more networks associated with the analytics platform. In addition, the audio recording of the call captured at step 310 may be converted from, for example, an MP3 file format to a different electronic file format, requiring less memory space for storage and less network bandwidth for transmission, as the audio recording is combined with the additional information described above to generate the electronic call record. In some examples, the audio recording captured at step 310 may comprise a tape and/or other analog recording of the call, and such a recording may be converted to one or more digital files, in any of the file formats described herein, at step 310 and/or step 314. As a result, the call record generated at step 314 may be easily transmitted from the analytics platform to the sponsor, the merchant, and/or any other entity via one or more of the networks described herein without overly burdensome bandwidth requirements. Additionally, the file type and/or format of the electronic call record generated at step 314 may be universally accepted by such recipients such that the information contained therein may be consumed without the need to convert the electronic call record to a different electronic file format upon receipt. In some examples, the electronic call record may be generated at step 314 at least partly in response to disabling the connection at step 312. In example embodiments, some or all of the information used by the server to generate the electronic call record at step 314 may be stored in one or more databases and can be exported into, for example, a plain text file or any other such file format. Additionally, the audio recording of the call may be stored in the format, quality, and/or encoding used by the server to record the call. Such format, quality, and/or encoding may vary on a call-by-call basis due to the user device from which the call is placed and/or due to the device of the merchant or other entity to which the call is placed. In any of the example embodiments described herein, the captured audio recording may be converted by the server or other components of the analytics platform into any known audio file format, and may be exported and/or otherwise provided by the server or other components of the analytics platform in converted form.

At step 316, the server and/or other components of the analytics platform may provide the call record for use by one or more entities associated with the analytics platform. For example, at step 316 the server and/or other components of the analytics platform may store the electronic call record in one or more databases accessible by the sponsor, and/or other customers of the analytics platform. Additionally, such databases may be accessible by the merchant and/or other entity associated with the particular advertisement and/or other particular content item rendered by the device, and/or by one or more intermediate companies or other entities servicing both the analytics platform and the merchant. In this way, multiple users or entities having access to such databases may consume and/or otherwise utilize the stored electronic call record for receiving information associated with calls placed via the analytics platform. In still further examples, the analytics platform may, at step 316, send and/or otherwise transfer copies of the electronic call record to the sponsor, the merchant, and/or other customers, entities, or intermediate companies for use.

As illustrated in FIG. 15, in further example methods 400 at least some of the device and/or user information described herein may not be received by the server or other components of the analytics platform at least until a connection between the device of the user and the device of the merchant has been established, or until after such a connection has been disabled. For example, at step 402, the server or other components of the analytics platform may receive a request from a user device to initiate a connection between the user device and a merchant corresponding to a particular advertisement rendered via the user device. In some examples, the request received at step 402 may be substantially similar to and/or the same as the connection request described above with respect to step 306. Additionally and/or alternatively, the connection request received at step 402 may comprise a signal, short message, marker, or other like instructions directing the server and/or other components of the analytics platform to collect information from the user device at a later time. In some examples, such information may include any of the information described above with respect to steps 302 and 304.

In still further examples, at step 402 the on-device application described above may receive input from the user indicative of the user's desire to establish a connection with the server and/or other components of the analytics platform. However, at the time such input is received, the on-device application, other software or hardware components of the user device, the server, and/or other components of the analytics platform may determine that providing user information from the user device to the analytics platform via the network may hinder real-time device performance. For example, the on-device application and/or the analytics platform may determine, in response to receiving such input from the user, that transferring a packet of user information to the analytics platform may reduce network bandwidth to a level below a predetermined minimum threshold. In other examples, the on-device application and/or the analytics platform may determine, in response to receiving such an input from the user, that transferring such a packet of user information to the analytics platform may require more memory, processor resources, or other resources of the user device than are currently available due to one or more additional applications operating on the device (and utilizing such resources). In response to one or more such determinations, the on-device application may store such user information locally on the user device, and may generate, provide, and/or store an on-device instruction operable to send such information from the user device to the analytics platform via the network at a later time when the required memory, processor resources, or other resources of the user device become available.

At step 404, and at least partly in response to receiving the connection request described above with respect to step 402, the server and/or other components of the analytics platform may establish a connection between the user device and a device of the merchant or other entity identified in the rendered advertisement and/or other particular content item. Additionally, at step 406 the server and/or other components of the analytics platform may capture call information associated with the connection. Further, the server and/or other components of the analytics platform may disable the connection between the user device in the device of the merchant at step 408 in response to, for example, an input received from the user via the user device indicative of a desire to end the call. In some examples, steps 404, 406, and 408 shown in FIG. 15 may be substantially similar to and/or the same as steps 308, 310, and 312 described above with respect to FIG. 14. For example, the call information captured at step 406 may include an audio recording corresponding to the connection and/or any other information described above with respect to step 310.

At step 410, the server and/or other components of the analytics platform may receive user information from the user device via the network. In such examples, the server and/or other components of the analytics platform may receive such information at step 412 in response to and/or based on, for example, the signal, short message, marker, or other like instructions described above with respect to step 402 directing the server and/or other components of the analytics platform to collect information from the user device. As noted above, such information may include any of the information described above with respect to steps 302 and 304. For example, the user information received at step 410 may include a first identifier that is unique to at least one of the user device or a user of the user device. For example, such a first identifier may comprise at least one of an account code of the user, a name of the user, an address of the user, a serial number of the user device, and/or a telephone user device. The user information received at step 410 may also include a second identifier indicating at least one of the particular advertisement and/or other particular content item rendered via the user device or a sponsor, such as an advertisement sponsor and/or other entity, that is associated with the particular advertisement. In still further examples, the second identifier may indicate a particular advertisement and/or other particular content item rendered via the user device, and the information received at step 410 may further include a third identifier indicating the sponsor and/or other entity associated with the particular advertisement or other such content item. In any the examples described herein, such user information may be received by the server and/or other components of the analytics platform at step 410 while the connection established at step 404 is active, or after the connection has been disabled at step 408. For example, the user information may be received by the server at step 410 at least partly in response to the connection being disabled at step 408.

In some examples, the first identifier and/or other user information received at step 410 may also comprise a unique ID generated at one of steps 402-410. The server and/or other components of the analytics platform may generate the unique ID based on the originating phone number of the user device, the type of device from which the information described above was received, and/or any of the other factors described above with respect to step 10 of FIG. 2. Additionally, the server and/or other components of the analytics platform may push the unique ID back to the user device at one of steps 402-410 such that any call and/or other connection request sent from the user device to the analytics platform may include the unique ID. As noted above with respect to step 10 of FIG. 2, such a unique ID may comprise, among other things, a telephone number, SIP user ID, or other mechanism used to link, for example, a phone call or other connection request to the user device and/or to a telephone number associated with the user device.

At step 412, the information received at step 410 may be stored in a database associated with the server. For example, such information may be stored in one or more databases associated with the call analytics platform, and such databases may comprise one or more components of the analytics platform. Further, in some examples, at step 412 the server and/or other components of the analytics platform may generate the unique ID described above. Regardless of when the unique ID is created, at step 412 the server and/or other components of the analytics platform may store the user information received at step 410 together with the unique ID and the call information captured at step 406. As a result, the unique ID is associated with and/or otherwise tied to the user information and the call information within the database.

At step 414, the server and/or other components of the analytics platform may generate an electronic call record corresponding to the connection established at step 404. In some examples, the electronic call record generated at step 414 may include, among other things, the audio recording captured at step 406, and any of the user information received at step 410. For example, the electronic call record may include the audio recording, and at least one of the first identifier, the second identifier, or the third identifier described above. In some examples, the call record generated at step 414 may be substantially similar to and/or the same as the call record described above with respect to step 314. Further, in some examples generating the call record at step 414 may include retrieving at least one of the first identifier, the second identifier, the third identifier, or the audio recording from the database associated with the analytics platform.

At step 416, the server and/or other components of the analytics platform may provide the call record for use by one or more entities associated with the analytics platform. For example, at step 416 the server and/or other components of the analytics platform may store the electronic call record in one or more databases accessible by the sponsor, customers of the analytics platform, and/or other entities. Additionally, such databases may be accessible by the merchant associated with the particular advertisement and/or other particular content item rendered by the device, and/or by one or more intermediate companies or other entities servicing both the analytics platform and the merchant. In this way, multiple users or entities having access to such databases may consume and/or otherwise utilize the stored electronic call record for receiving information associated with calls placed via the analytics platform. In still further examples, the analytics platform may, at step 416, send and/or otherwise transfer copies of the electronic call record to the sponsor, the merchant, and/or other customers, intermediate companies, and/or or other entities for use. Any of the processes performed by the server and/or other components of the analytics platform at step 416 may be similar to and/or the same as the processes described above with respect to step 316.

In performing one or more of the steps described herein with respect to at least FIGS. 2-8, 14, and 15, the analytics platform may serve as a clearinghouse enabling multiple affiliated entities (e.g., customers, sponsors, merchants, etc.) to use a common reporting and/or analytics mechanism, such as the electronic call record described above with respect to steps 314 and 414, for receiving information of any kind. As a result, the various processes described herein may be employed to solve the technology-specific and Internet-centric problem of attributing appropriate credit (e.g., payment) to the particular customers, sponsors, or other entities responsible for providing a particular advertisement, video, audio, text, script, image, or any other content rendered via the user device and resulting in a corresponding call being placed to an entity, such as a merchant, associated with the particular content. In existing Internet-based and/or other like networked call handling platforms, the entity (e.g., a merchant) ultimately receiving the call from a user, via the call handling platform, has no way of knowing which front-end sponsor or other such customer or entity was responsible for providing the particular content (e.g., a particular advertisement) to the user and resulting in the call.

The various systems and methods described herein, however, solve this "attribution" problem by generating an electronic call record that includes information (e.g., one or more identifiers) indicating, and specifically identifying, the particular entity (e.g., an advertisement sponsor) that is responsible for publishing the content to the user via the user device. As a result, in some example embodiments, the advertisement sponsor responsible for publishing the particular advertisement corresponding to the call will be apparent to any entity consuming the electronic call record. As noted above, the analytics platform accomplishes this by generating a unique ID and associating the unique ID with the user device and/or the telephone number associated with the device. The analytics platform associates the same unique ID with some or all information received from the user device, and via the on-device application, indicating interactions between the user and the particular rendered content. Such information may include, for example, the identity of the advertisement sponsor or other entity responsible for publishing the particular content via the user device. For example, the analytics platform may receive one or more signals or messages, sent by the on-device application, indicating that a particular advertisement, published by a specific advertisement sponsor, was rendered on the device. This information may also include an identifier associated with the user and/or the user device (e.g., the unique ID), and the analytics platform may store such information in association with the corresponding unique ID. Accordingly, when a call and/or other connection request is received including the unique ID, the analytics platform may match any call or context information captured with the particular advertisement sponsor responsible for publishing the advertisement based on the unique ID. While various examples and figures (e.g., FIGS. 14 and/or 15) have been described herein as having applicability to calls associated with advertising or advertising environments, in additional example embodiments, any of the systems, components, methods or other concepts described herein may be used to process calls of any kind, and between any senders and/or receivers of such calls. For example, while some of the figures here have been described in the context of call tracking in the advertising space, any of the systems, components, methods of other concepts described herein may be equally applicable to processing calls and/or information in retail, telemarketing, food services, legal services, accounting, gaming, and/or any other industry in which calls or other information is transferred between entities/people.

The foregoing description of the exemplary embodiments is provided to enable any person having skill in the art to make or use the claimed subject matter. Although example diagrams to implement the elements of the disclosed subject matter have been provided, one skilled in the art, using this disclosure, could develop additional hardware and/or software to practice the disclosed subject matter and each is intended to be included herein. In addition to the above described embodiments, those skilled in the art will appreciate that this disclosure has application in a variety of arts and situations and this disclosure is intended to include the same. It is intended that all such additional systems, methods, features, and advantages that are included within this description be within the scope of the claims.

What is claimed is:

1. A method, comprising:
    receiving, with a server, user information from a user device, the user information including a first identifier unique to at least one of the user device or a user of the user device, a second identifier indicating a particular content item rendered via the user device, and a third identifier indicating a sponsor that is associated with the particular content item and that is at least partly responsible for providing the particular content item;
    receiving, with the server, a request from the user device to initiate a connection between the device and an entity corresponding to the particular content item;
    at least partly in response to receiving the request,
    establishing, via the server, a connection between the user device and a device of the entity, and
    capturing, with the server, call information associated with the connection, wherein the call information includes an audio recording corresponding to the connection; and
    generating an electronic call record corresponding to the connection, wherein the call record comprises the audio recording, and the first, second, and third identifiers.

2. The method of claim 1, wherein the entity comprises a first entity and the sponsor comprises a second entity different from the first entity.

3. The method of claim 1, wherein the user information is sent via a mobile device application operable on the user device.

4. The method of claim 1, wherein the first identifier comprises at least one of an account code of the user, a name of the user, an address of the user, a serial number of the user device, or a telephone number of the user device.

5. The method of claim 1, wherein the audio recording comprises a recording of a conversation between a first user operating the user device and a second user operating the device of the entity.

6. The method of claim 1, wherein the call information comprises at least one of a start time of the connection, an end time of the connection, a connection duration, a telephone number of the user device, a telephone number of the entity, or an indication of an input received via the user device while the connection was active.

7. The method of claim 1, further comprising storing at least one of the first identifier, the second identifier, or the third identifier in a database associated with the server, and retrieving the at least one of the first identifier, the second identifier, or the third identifier at least partly in response to receiving the request.

8. The method of claim 1, further comprising disabling the connection between the user device and the device of the entity, and generating the electronic call record at least partly in response to disabling the connection.

9. The method of claim 1, further comprising providing, via the server, the electronic call record to at least one of the sponsor or the entity.

10. A method, comprising:
    receiving, with a server, a request from a user device to initiate a connection between the user device and a entity corresponding to a particular content item rendered via the user device;
    at least partly in response to receiving the request,
    establishing, via the server, a connection between the user device and a device of the entity, and
    capturing, with the server, call information associated with the connection, wherein the call information includes an audio recording corresponding to the connection;
    disabling the connection between the user device and the device of the entity;
    receiving, with the server, user information from the user device, the user information including a first identifier and a second identifier, wherein:
    the first identifier is unique to at least one of the user device or a user of the user device,
    the second identifier indicates at least one of the particular content item rendered via the user device or a sponsor that is at least partly responsible for providing the particular content item, and
    the user information is received by the server while the connection is active or after the connection has been disabled; and
    generating an electronic call record corresponding to the connection, wherein the call record comprises the audio recording, the first identifier, and the second identifier.

11. The method of claim 10, wherein the user information comprises information stored via a mobile device application operable on the user device and at least partly in response to an input received via the user device during or after the particular content item has been rendered.

12. The method of claim 10, wherein the user information is received by the server at least partly in response to the connection being disabled.

13. The method of claim 10, wherein the first identifier comprises at least one of an account code of the user, a name of the user, an address of the user, a serial number of the user device, or a telephone number of the user device.

14. The method of claim 10, wherein the audio recording comprises a recording of a conversation between a first user operating the user device and a second user operating the device of the entity, the method further comprising receiving the audio recording, from the user device, with the server.

15. The method of claim 10, wherein the call information comprises at least one of a start time of the connection, an end time of the connection, a connection duration, a telephone number of the user device, a telephone number of the entity, or an indication of an input received via the user device while the connection was active.

16. The method of claim 10, further comprising storing at least one of the first identifier or the second identifier in a database associated with the server, wherein generating the call record comprises retrieving the at least one of the first identifier or the second identifier from the database.

17. A system, comprising:
    a server computer; and
    a non-transitory computer-readable memory storing instructions that, when executed by the server computer, cause the server computer to perform steps, comprising:

receiving user information from a user device, the user information including a first identifier unique to at least one of the user device or a user of the user device, a second identifier indicating a particular content item rendered via the user device, and a third identifier indicating a sponsor that is associated with the particular content item and that is at least partly responsible for providing the particular content item;

establishing, via the server computer, a connection between the user device and a device of an entity corresponding to the particular content item;

capturing call information associated with the connection, wherein the call information includes an audio recording corresponding to the connection; and generating an electronic call record corresponding to the connection, wherein the call record comprises the audio recording, and the first, second, and third identifiers.

18. The system of claim 17, wherein the user information is received by the server computer while the connection is active or after the connection has been disabled.

19. The system of claim 17, wherein the user information comprises information stored via a mobile device application operable on the user device and at least partly in response to an input received via the user device during or after the particular content item has been rendered.

20. The system of claim 17, wherein the steps further include:

storing at least one of the first identifier, the second identifier, or the third identifier in the non-transitory computer readable memory;

receiving a request from the user device to initiate the connection between the user device and the device of the entity; and retrieving the at least one of the first identifier, the second identifier, or the third identifier at least partly in response to receiving the request.

* * * * *